United States Patent
Khan et al.

(10) Patent No.: US 10,657,317 B2
(45) Date of Patent: May 19, 2020

(54) DATA VISUALIZATION USING CLIENT-SERVER INDEPENDENT EXPRESSIONS

(71) Applicant: Elasticsearch B.V., Mountain View, CA (US)

(72) Inventors: Rashid Khan, Phoenix, AZ (US); Joseph Fleming, Chandler, AZ (US)

(73) Assignee: Elasticsearch B.V., Mountain View, CA (US)

( * ) Notice: Subject to any disclaimer, the term of this patent is extended or adjusted under 35 U.S.C. 154(b) by 0 days.

(21) Appl. No.: 15/907,280

(22) Filed: Feb. 27, 2018

(65) Prior Publication Data

US 2019/0266232 A1     Aug. 29, 2019

(51) Int. Cl.

| | |
|---|---|
| *G06F 9/48* | (2006.01) |
| *G06F 40/166* | (2020.01) |
| *G06F 3/0483* | (2013.01) |
| *G06T 11/20* | (2006.01) |
| *G06F 16/904* | (2019.01) |
| *G06F 16/9535* | (2019.01) |
| *H04L 29/06* | (2006.01) |

(52) U.S. Cl.
CPC .......... *G06F 40/166* (2020.01); *G06F 3/0483* (2013.01); *G06F 16/904* (2019.01); *G06F 16/9535* (2019.01); *G06T 11/206* (2013.01); *H04L 67/42* (2013.01)

(58) Field of Classification Search
CPC ............... G06F 17/24; G06F 17/30867; G06F 17/30994; G06F 3/0483; G06F 16/904; G06F 16/9535; G06F 11/3414; G06F 16/2455; G06F 8/31; G06F 9/54; G06T 11/206; H04L 67/42; H04L 67/10
See application file for complete search history.

(56) References Cited

U.S. PATENT DOCUMENTS

| | | | | |
|---|---|---|---|---|
| 6,157,934 A | * | 12/2000 | Khan ..................... | G06Q 10/10 709/203 |
| 6,243,710 B1 | * | 6/2001 | DeMichiel .......... | G06F 16/2455 707/704 |
| 7,043,534 B1 | * | 5/2006 | Donnelly ................ | H04L 67/10 709/203 |
| 7,444,584 B1 | * | 10/2008 | Hobbs ................... | G06F 17/246 715/212 |
| 7,865,525 B1 | * | 1/2011 | Lusk ....................... | H04L 67/42 707/791 |

(Continued)

*Primary Examiner* — Wilson W Tsui
(74) *Attorney, Agent, or Firm* — Carr & Ferrell LLP

(57) ABSTRACT

Systems and methods for iterating between a graphical user interface and an expression for data visualization. Exemplary methods include: evaluating an expression at a client, the expression associated with a component, the evaluating determining data is to be retrieved from a server; running at least part of the expression at the server, the server determining input from the client is to be used to process the at least part of the expression; processing the modified expression at the client, the processing including getting the input at the client and providing the input to the server; and resuming the running of the at least part of the expression at the server, the resuming including running the at least part of the expression using the input to produce retrieved data and giving the retrieved data to the client.

19 Claims, 32 Drawing Sheets

(56) References Cited

U.S. PATENT DOCUMENTS

| | | | |
|---|---|---|---|
| 7,870,492 B2* | 1/2011 | Mukundan | G06F 9/542 |
| | | | 715/749 |
| 9,201,924 B1* | 12/2015 | Fuller | G06F 16/2455 |
| 9,524,323 B2 | 12/2016 | Meek et al. | |
| 10,162,613 B1 | 12/2018 | Vilozny et al. | |
| 2001/0027462 A1* | 10/2001 | Muramatsu | G06F 9/485 |
| | | | 718/102 |
| 2004/0148592 A1* | 7/2004 | Vion-Dury | G06F 8/437 |
| | | | 717/152 |
| 2005/0165900 A1* | 7/2005 | Bodin | G06F 17/30035 |
| | | | 709/217 |
| 2005/0192756 A1* | 9/2005 | Varpela | G06F 19/12 |
| | | | 702/19 |
| 2009/0077047 A1 | 3/2009 | Cooper et al. | |
| 2009/0100360 A1* | 4/2009 | Janzen | G06F 17/246 |
| | | | 715/764 |
| 2009/0327468 A1* | 12/2009 | Hirsch | G06F 9/54 |
| | | | 709/223 |
| 2011/0029933 A1* | 2/2011 | Chu | G06F 17/30873 |
| | | | 715/854 |
| 2011/0225195 A1* | 9/2011 | Kubicki | G06Q 30/0629 |
| | | | 707/776 |
| 2012/0011458 A1* | 1/2012 | Xia | G06F 3/04847 |
| | | | 715/771 |
| 2012/0084301 A1* | 4/2012 | Sarnowicz | G06F 16/9535 |
| | | | 707/754 |
| 2012/0239420 A1* | 9/2012 | Stapelfeldt | G06Q 10/10 |
| | | | 705/2 |
| 2012/0253791 A1 | 10/2012 | Heck et al. | |
| 2012/0304156 A1 | 11/2012 | Feiveson et al. | |
| 2013/0346895 A1 | 12/2013 | Selgas et al. | |
| 2014/0149399 A1 | 5/2014 | Kurzion | |
| 2014/0280952 A1* | 9/2014 | Shear | H04L 47/70 |
| | | | 709/226 |
| 2014/0297725 A1 | 10/2014 | Biron, III | |
| 2015/0058327 A1* | 2/2015 | Frank | G06Q 10/06 |
| | | | 707/722 |
| 2015/0222730 A1* | 8/2015 | Gower | H04L 67/42 |
| | | | 709/203 |
| 2015/0324440 A1 | 11/2015 | Subramanian et al. | |
| 2016/0232537 A1* | 8/2016 | Nonez | G06Q 30/0201 |
| 2016/0291942 A1* | 10/2016 | Hutchison | G06F 8/451 |
| 2017/0124220 A1* | 5/2017 | Krueger | G06F 17/30395 |
| 2017/0161390 A1* | 6/2017 | Kavas | G06F 17/30867 |
| 2017/0270572 A1* | 9/2017 | Schydlowsky | G06F 16/9535 |
| 2018/0032316 A1* | 2/2018 | Dinga | G06F 17/30675 |
| 2018/0129746 A1* | 5/2018 | Zhu | G06F 16/9535 |
| 2018/0181657 A1* | 6/2018 | Giardina | G06F 17/30864 |
| 2018/0278725 A1* | 9/2018 | Thayer | H04L 69/08 |
| 2018/0341956 A1* | 11/2018 | Everhart | G06Q 30/0201 |
| 2018/0375745 A1* | 12/2018 | Balupari | H04L 43/062 |
| 2019/0265853 A1 | 8/2019 | Khan et al. | |

\* cited by examiner

FIG. 2E

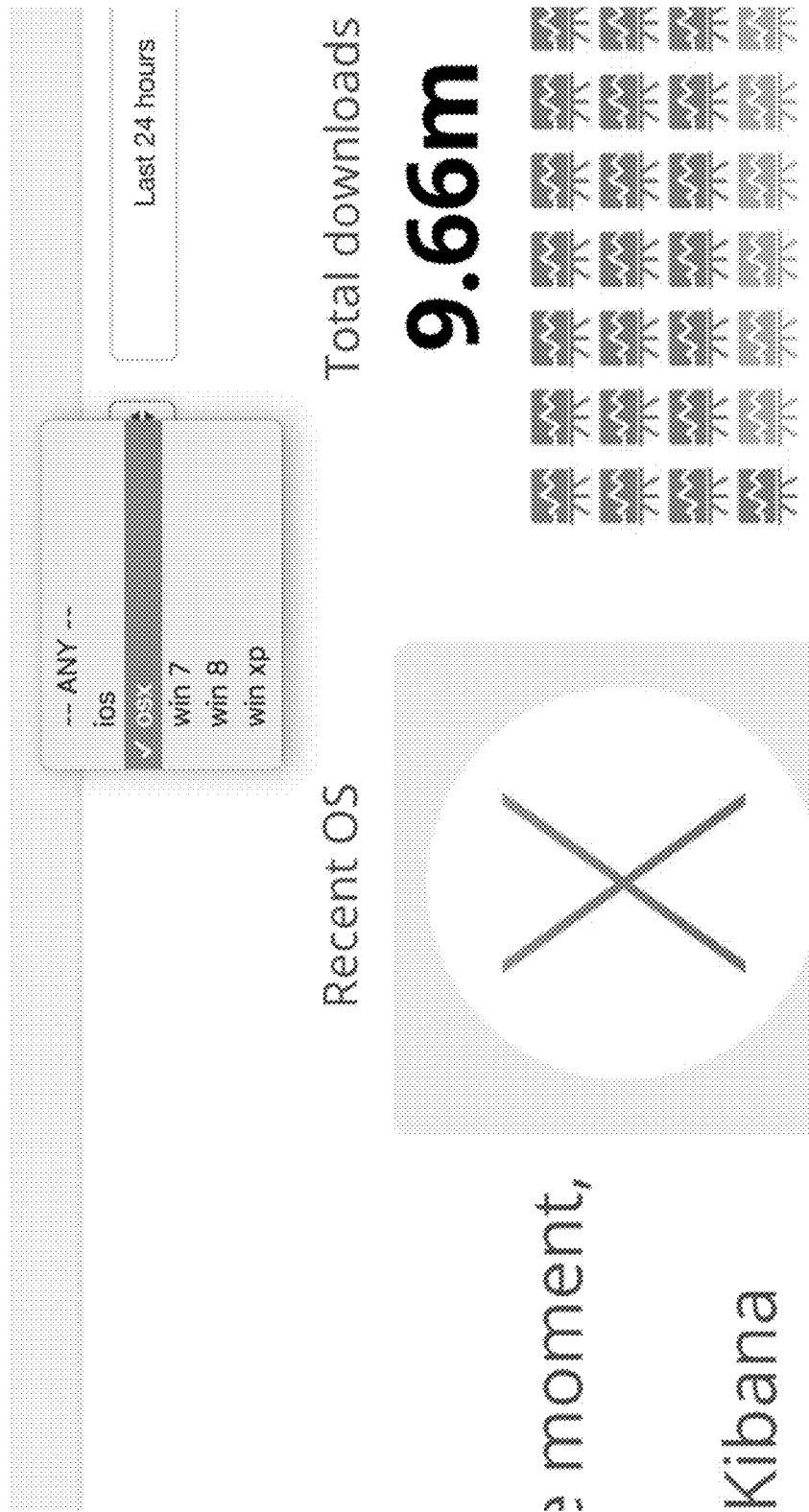

310 → esdocs fields=bytes,@timestamp

320 → | staticColumn column=total value={math 'sum(bytes)'}

| sleep 500 ← 330

340 → | mapColumns column=@timestamp, fn=${getColumn @timestamp

350 → | rounddate 'YYYY-MM-DD'}

FIG. 3

DATA VISUALIZATION USING CLIENT-SERVER INDEPENDENT EXPRESSIONS

CROSS REFERENCE TO RELATED APPLICATION

This application is related to application Ser. No. 15/907,274, filed Feb. 27, 2018, the disclosure of which is hereby incorporated by reference.

TECHNICAL FIELD

The present technology relates generally to search engines and more specifically to data visualization.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A search engine is an information retrieval system designed to help find information stored on a computer system. Search engines help to minimize the time required to find information and the amount of information that is checked. Data visualization concerns communicating information clearly and efficiently using statistical graphics, plots, and information graphics. Numerical data can be encoded using dots, lines, or bars, to visually communicate quantitative information.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for data visualization using client-server independent expressions. Specifically, a method may comprise: evaluating an expression at a client, the expression associated with a component, the evaluating determining data is to be retrieved from a server; running at least a part of the expression at the server, the server determining input from the client is to be used to process the at least the part of the expression; processing the modified expression at the client, the processing including getting the input at the client and providing the input to the server; resuming the running the at least the part of the expression at the server, the resuming including running the at least the part of the expression using the input to produce retrieved data and giving the retrieved data to the client; running the expression at the client using the retrieved data to produce the component; and displaying the component using the evaluation of the edited expression.

BRIEF DESCRIPTION OF THE DRAWINGS

Embodiments are illustrated by way of example, and not by limitation, in the figures of the accompanying drawings, in which like references indicate similar elements and in which:

FIG. 3 depicts an example expression, in accordance with some embodiments.

DETAILED DESCRIPTION

Figure 1:
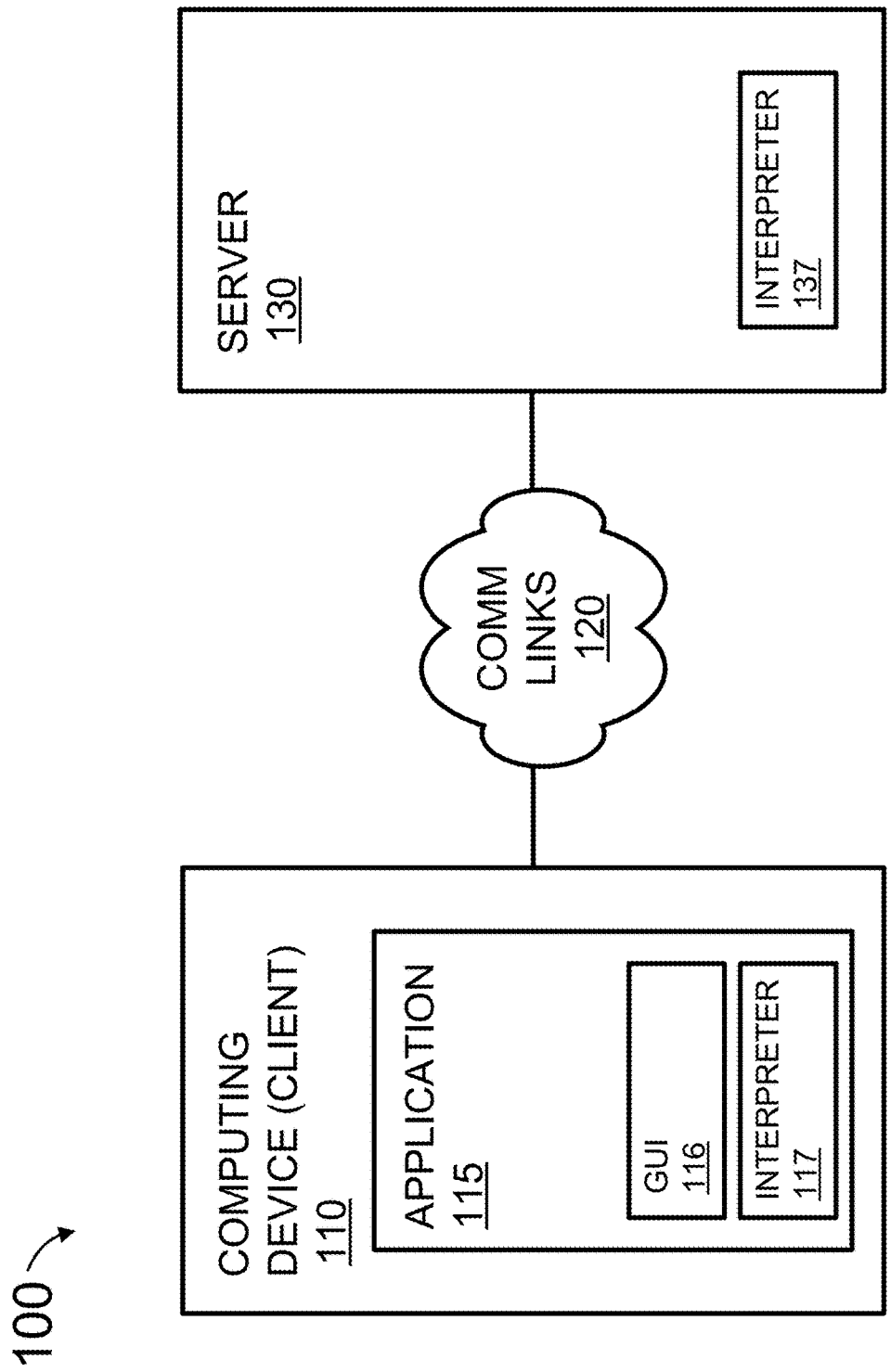
FIG. 1 is a simplified representation of a system for iterating between a graphical user interface and an expression for data visualization, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 illustrates system 100 for data visualization according to some embodiments. System 100 can include client 110, communications links 120, and server 130. Client 110 can include application 115. Application 115 can provide visualization capabilities on top of content (data) stored on server 130. Application 115 can be a standalone computer program, a plug-in (e.g., software component that adds a specific feature to an existing computer program) such as for a web browser, and the like. A web browser can be a computer program for retrieving, presenting, and traversing information resources on the World Wide Web, web servers in private networks, files in file systems, and the like, such as Mozilla Firefox, Google Chrome, Apple Safari, Microsoft Edge, and the like.

Application 115 can include graphical user interface (GUI) 116 and interpreter 117. GUI 116 can be a type of user interface that allows users to interact with application 115 through graphical icons, visual indicators, and menus. User actions in GUI 116 can be performed through manipulation of the graphical elements (e.g., using a mouse, touch pad, touch screen, etc.). Interpreter 117 can be a computer program (e.g., part of application 115) that directly executes (e.g., performs) instructions (e.g., expressions) written in a programming or scripting language, without requiring them to have been compiled earlier.

Client 110 can include input devices (e.g., mouse, keyboard, touch screen, etc.), output devices (e.g., display, speaker, etc.), one or more processors, memory, operating system (e.g., Microsoft Windows, Google Android, Apple macOS, Apple iOS, Linux, etc.), non-volatile storage (e.g., flash memory, hard disk, solid-state disk, etc.), wired and/or wireless communications interfaces (e.g., Ethernet, Wi-Fi, Bluetooth, mobile broadband, etc.), Global Positioning System (GPS) receiver, and the like (not shown in FIG. 1). Client 110 is described further in relation to FIG. 9.

Figure 9:
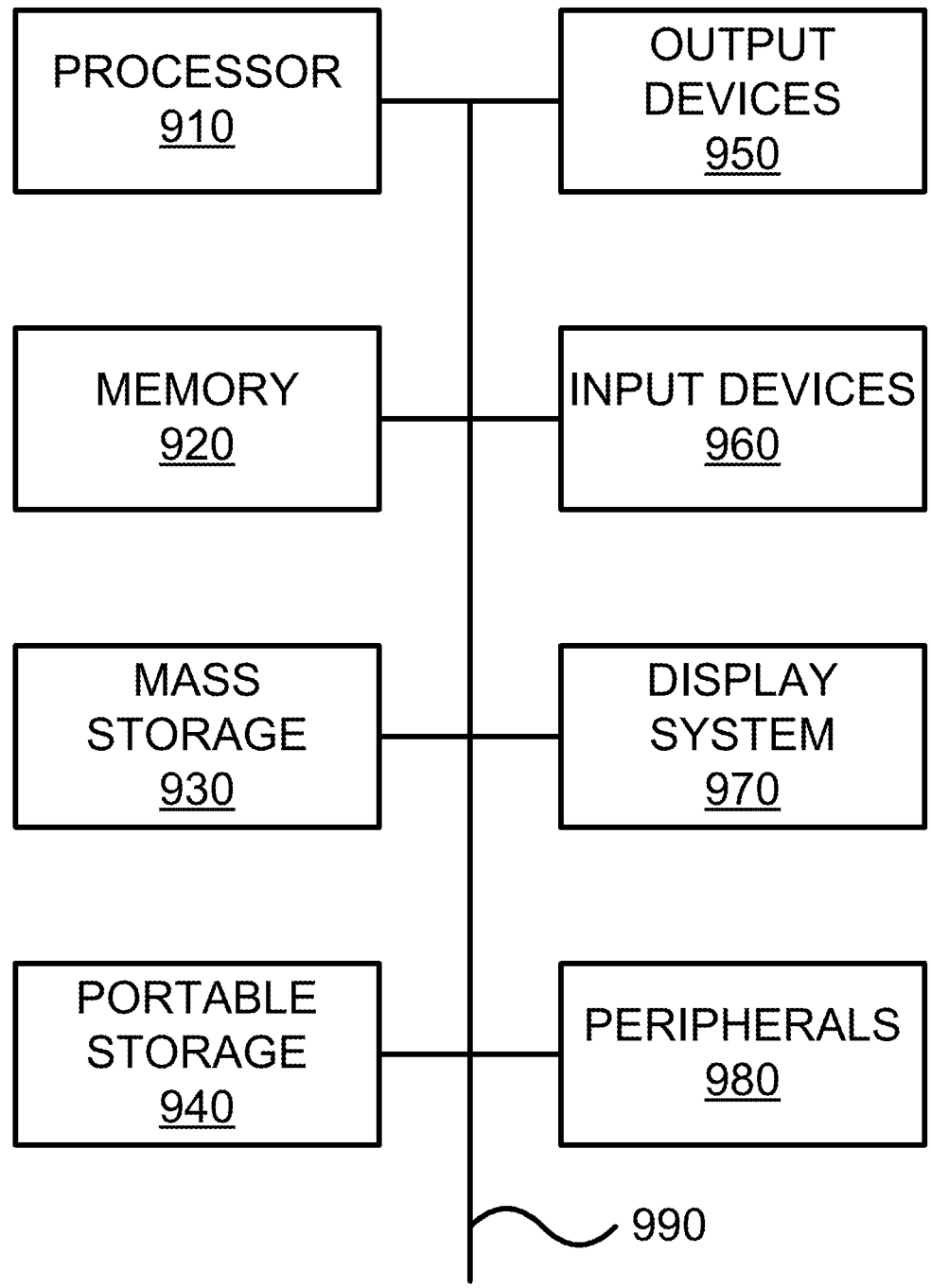
FIG. 9 is a simplified block diagram of a computing system, in accordance with various embodiments, according to some embodiments.

Communications links 120 can be various combinations and permutations of wired and wireless networks (e.g., Ethernet, Wi-Fi, Bluetooth, mobile broadband, the Internet, etc.), internal/external computer busses, and the like, such as described in relation to FIG. 9. Although depicted as a single "block," communications links 120 can be, for example, multiple distinct/separate combinations and permutations of wired and wireless networks, internal/external computer busses, and the like.

Server 130 can include interpreter 137. Interpreter 137 includes at least some of the characteristics of interpreter 117. The operation/functionality of interpreters 117 and 137 can overlap. In some embodiments, of interpreters 117 and 137 utilize the same program code (e.g., possibly compiled to run on different types of processors), but running in different locations (e.g., client and server).

In some embodiments, server 130 includes one or more hardware servers, virtual machines, containers, and the like. Server 130 can further include one or more physical storage devices (e.g., hard disks, solid-state disks, etc.), virtual storage devices, and the like for storing data. Constituents of server 130 can be disposed in the same and/or different locations (e.g., factories, data centers, cities, counties, geographic regions, countries, continents, etc.). Constituents of server 130 can be in a cloud computing environment. Constituents of server 130 can each include a communications link, such as a wired and/or wireless communications network (e.g., Ethernet, Wi-Fi, Bluetooth, mobile broadband, etc.) connection, radio, modem, network adapter, and the like, for communications with client 110. Server 130 is described further in relation FIG. 9.

Figure 2A:
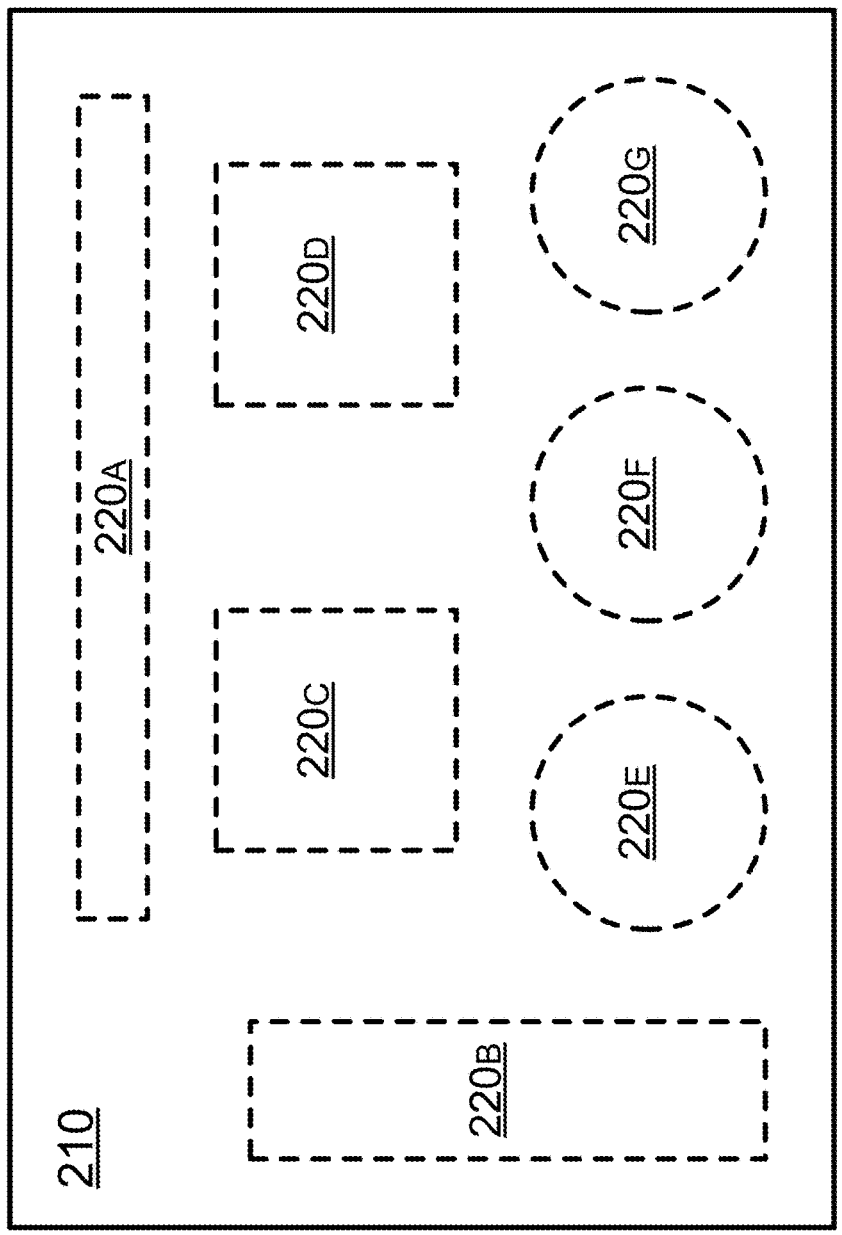
FIGS. 2A-Q illustrate various embodiments of the application of FIG. 1, according to various embodiments.

FIG. 2A shows application 115 in accordance with some embodiments. Application 115 offers (two-dimensional) space 210 on which components (also called elements) $220_A$-$220_G$ can be disposed (e.g., at the direction of a user using GUI 116 in FIG. 1). For example, a component of components $220_A$-$220_G$ can be added to space 210 by selecting a component type from a menu and placing onto space 210 (e.g., at the direction of a user using GUI 116). By way of further non-limiting example, components $220_A$-$220_G$ can each be combinations and permutations of images/graphics, text, charts (e.g., line plot, scatter plot, column chart, bar chart, pie chart, area chart, box plot, surface chart, doughnut chart, bubble chart, radar chart, etc.), drop down menu, search box, and the like. Although components $220_A$-$220_G$ depict seven components in space 210, any number of components in any arrangement can be used.

Application 115 can change (e.g., at the direction of a user using GUI 116 in FIG. 1) the style (appearance) of each component of components $220_A$-$220_G$, such as by resizing, rotating, changing colors (e.g., drawn from a provided palette), fonts, borders, and the like. Application 115 can further change (e.g., at the direction of a user using GUI 116) a data source of server 130 from which data for each component of components $220_A$-$220_G$ is drawn. In some embodiments, Application 115 draws data from a data source of server 130 for each component of components $220_A$-$220_G$ at the creation of each component of components $220_A$-$220_G$, on demand, at a fixed interval of time, at a variable interval of time, and the like. Although server 130 is described as having a data source, among other features, other data sources can be used (e.g., other external systems using an application programming interface (API)).

Figure 2B:
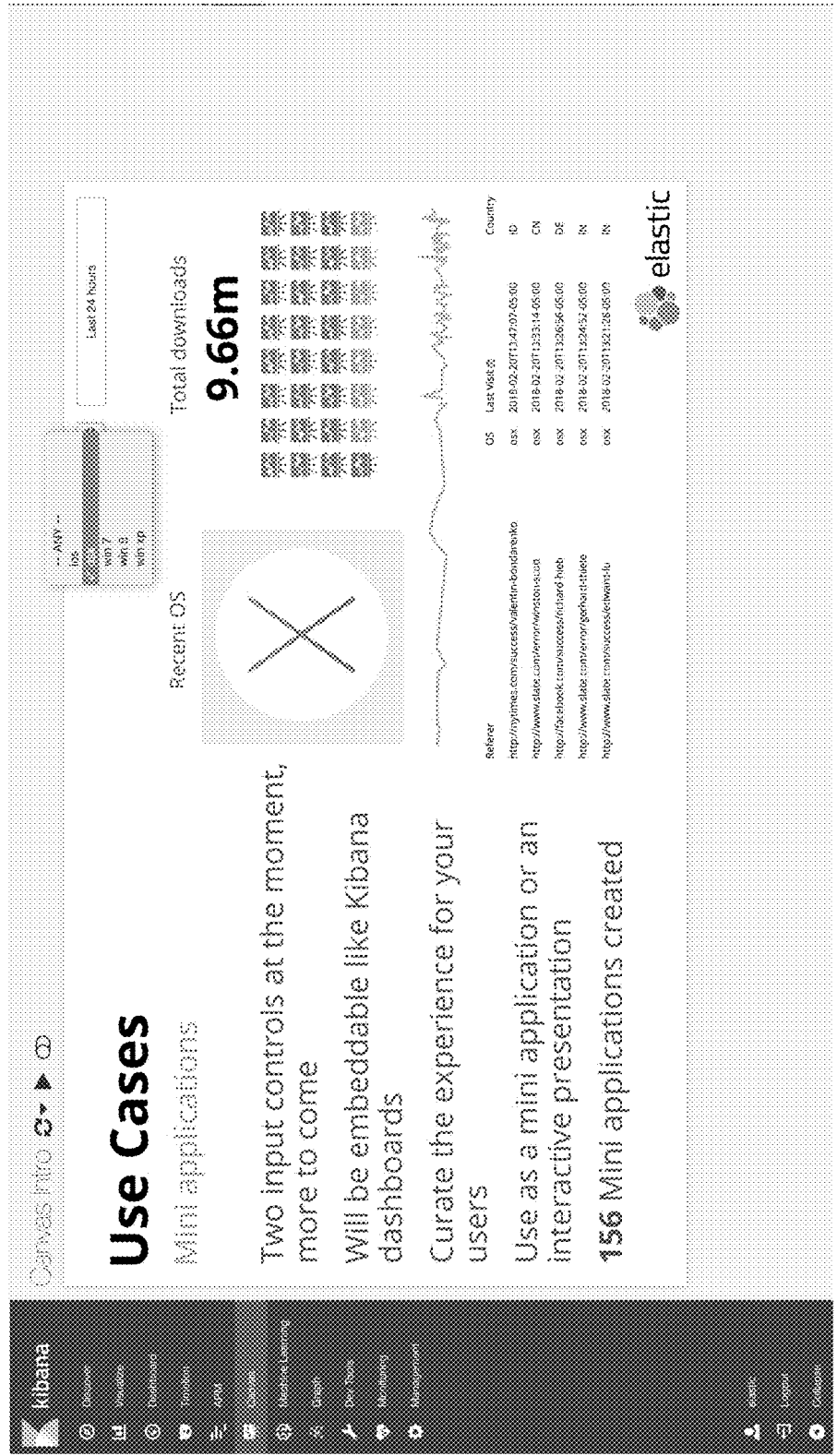
Figure 2C:
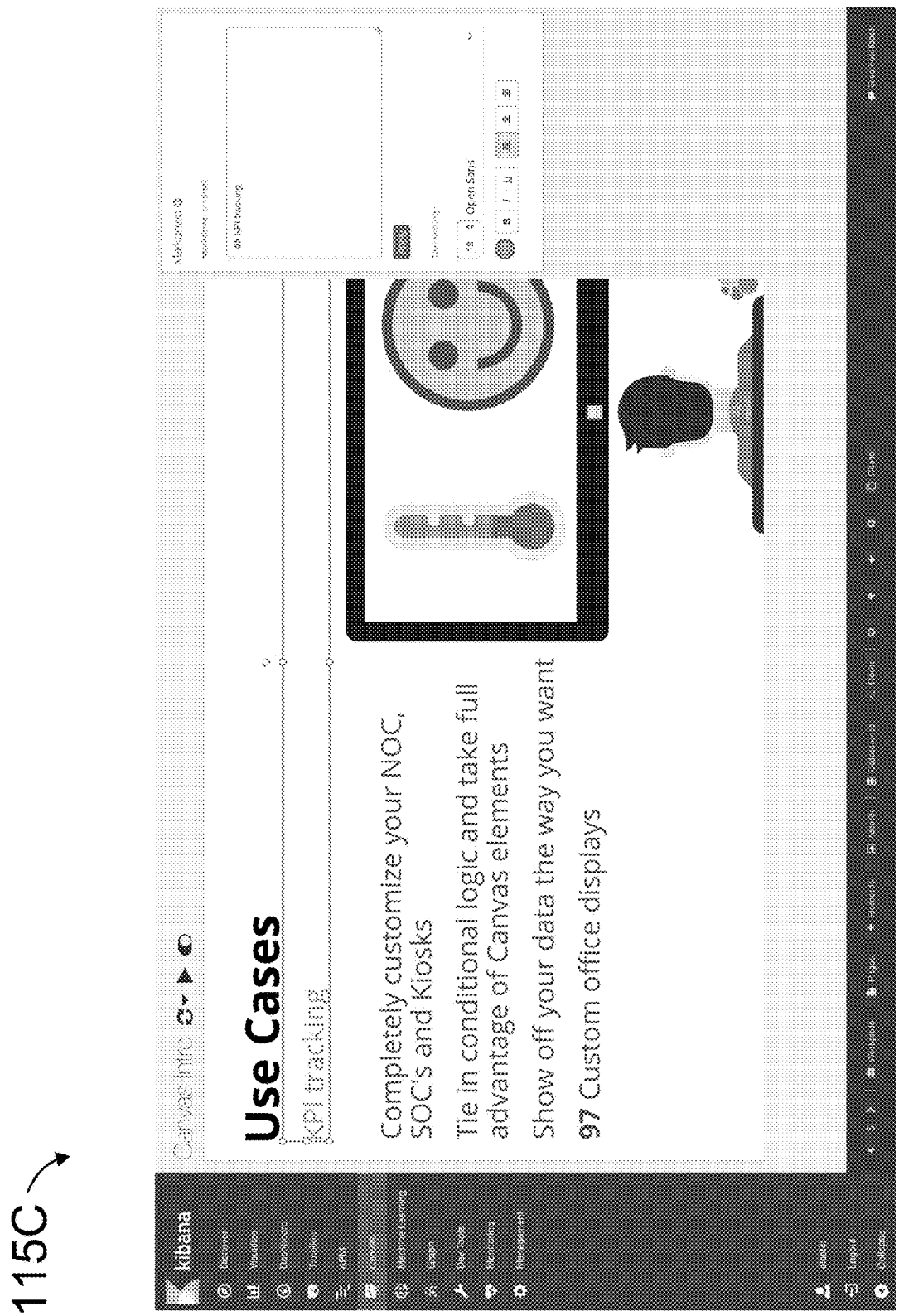
Figure 2D:
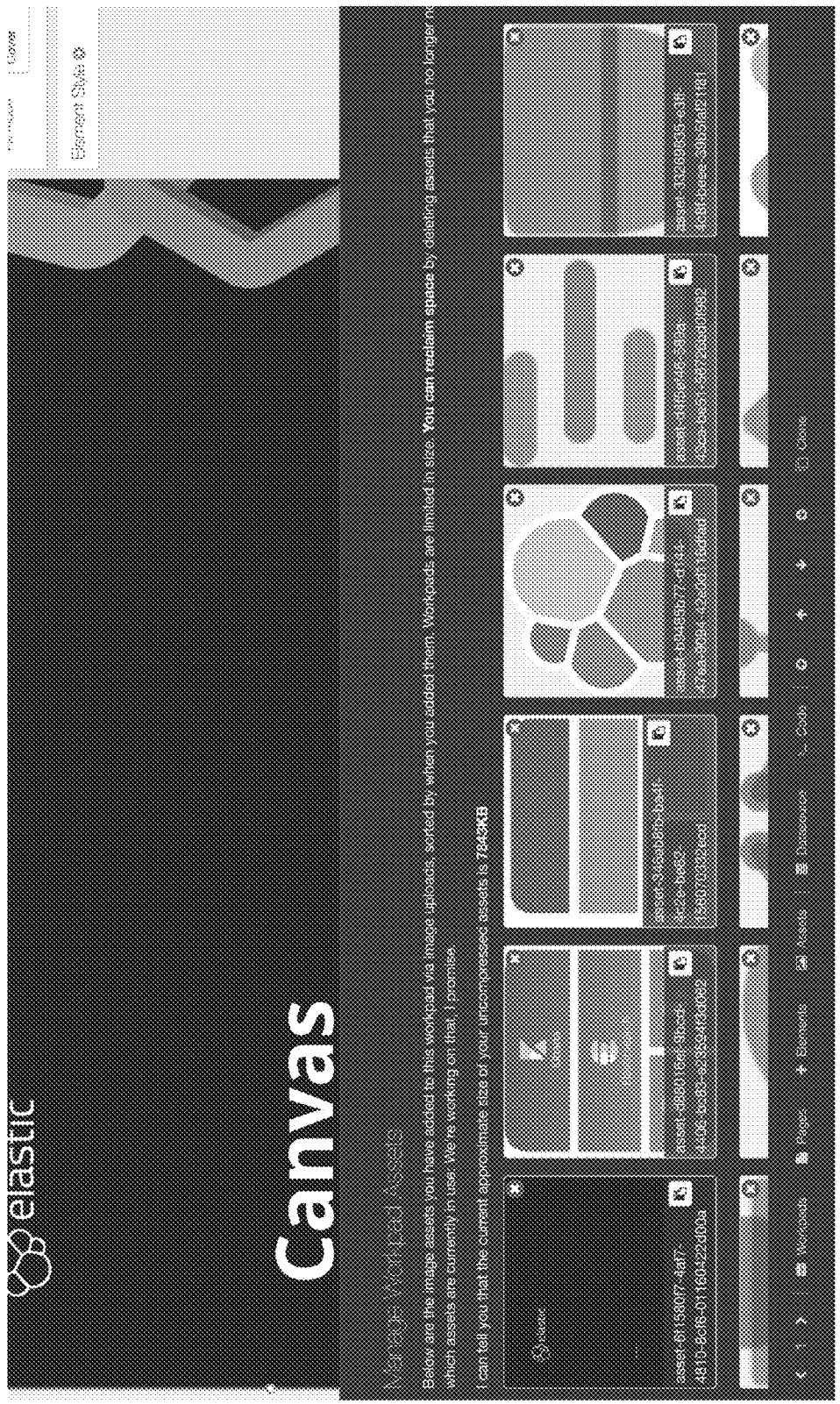
Figure 2E:
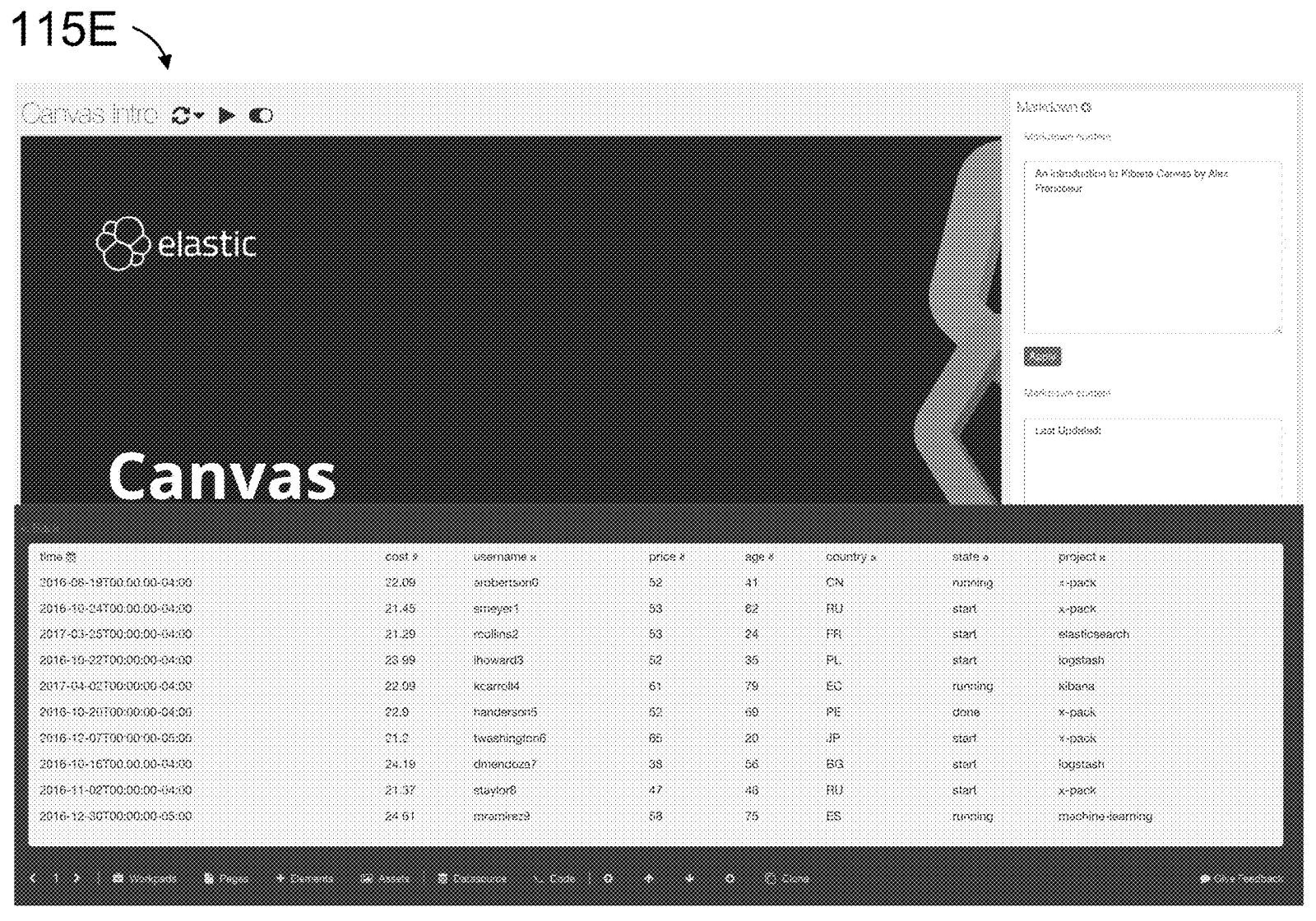
Figure 2F:
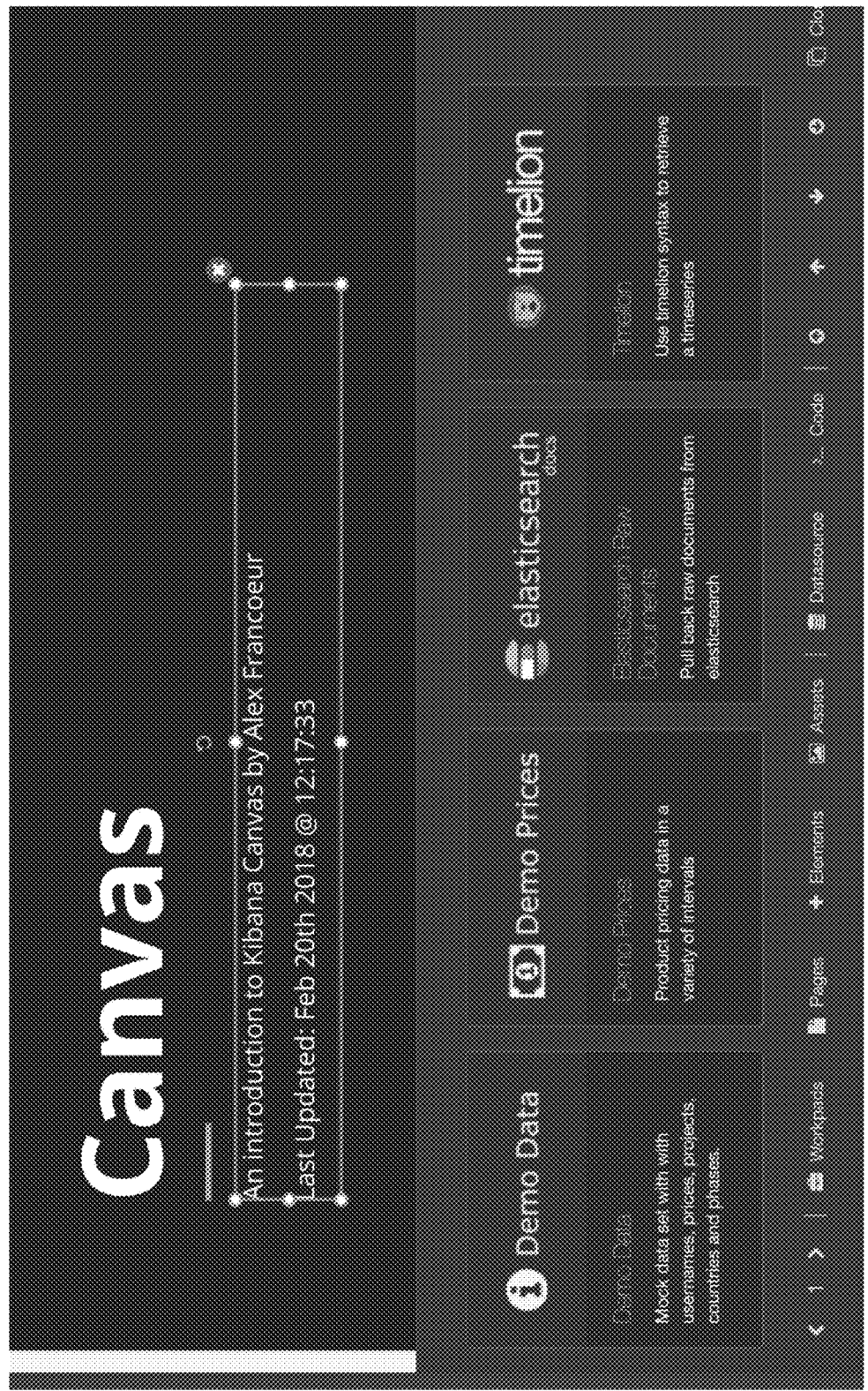
Figure 2H:
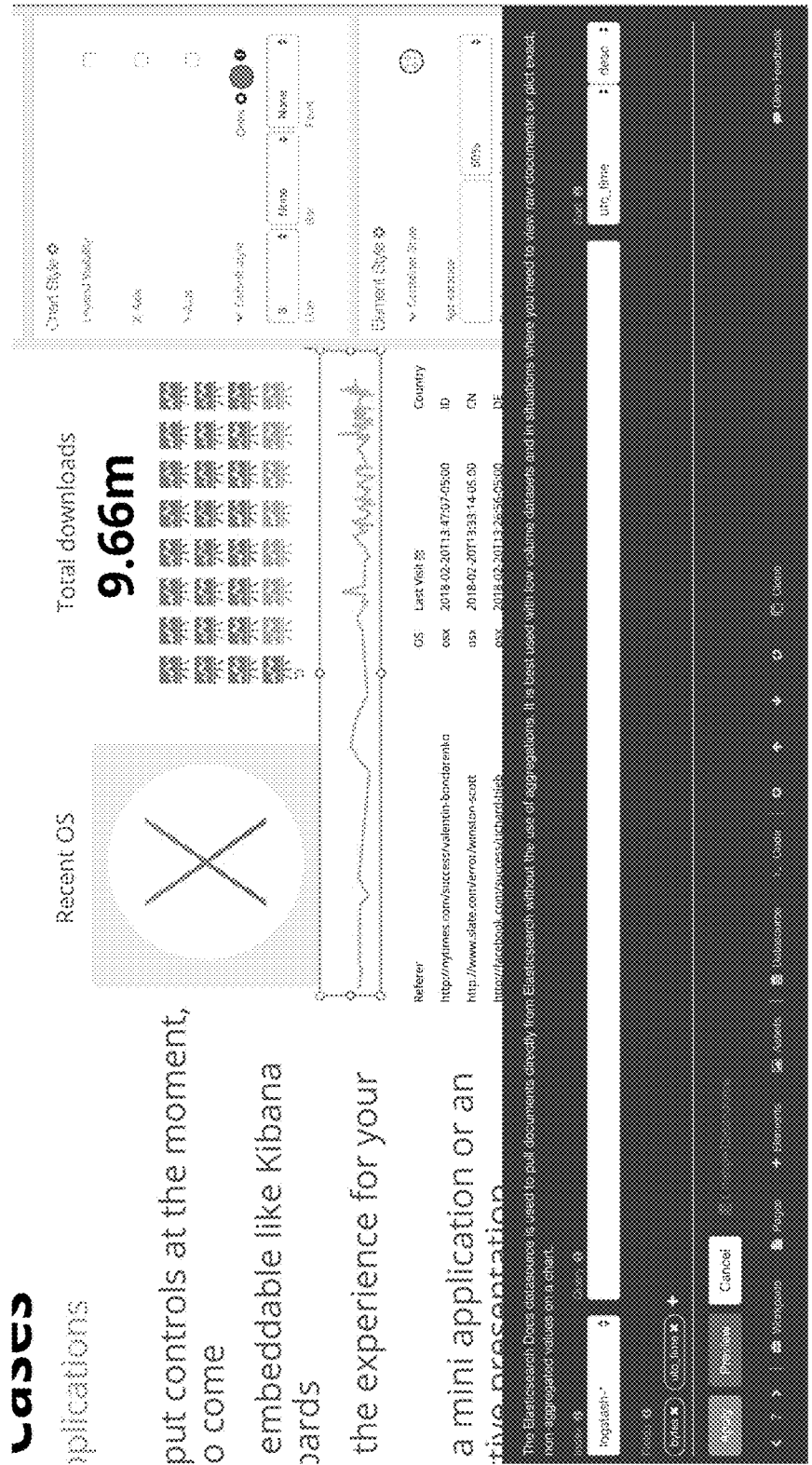
Figure 2I:
Figure 2J:
Figure 2L:
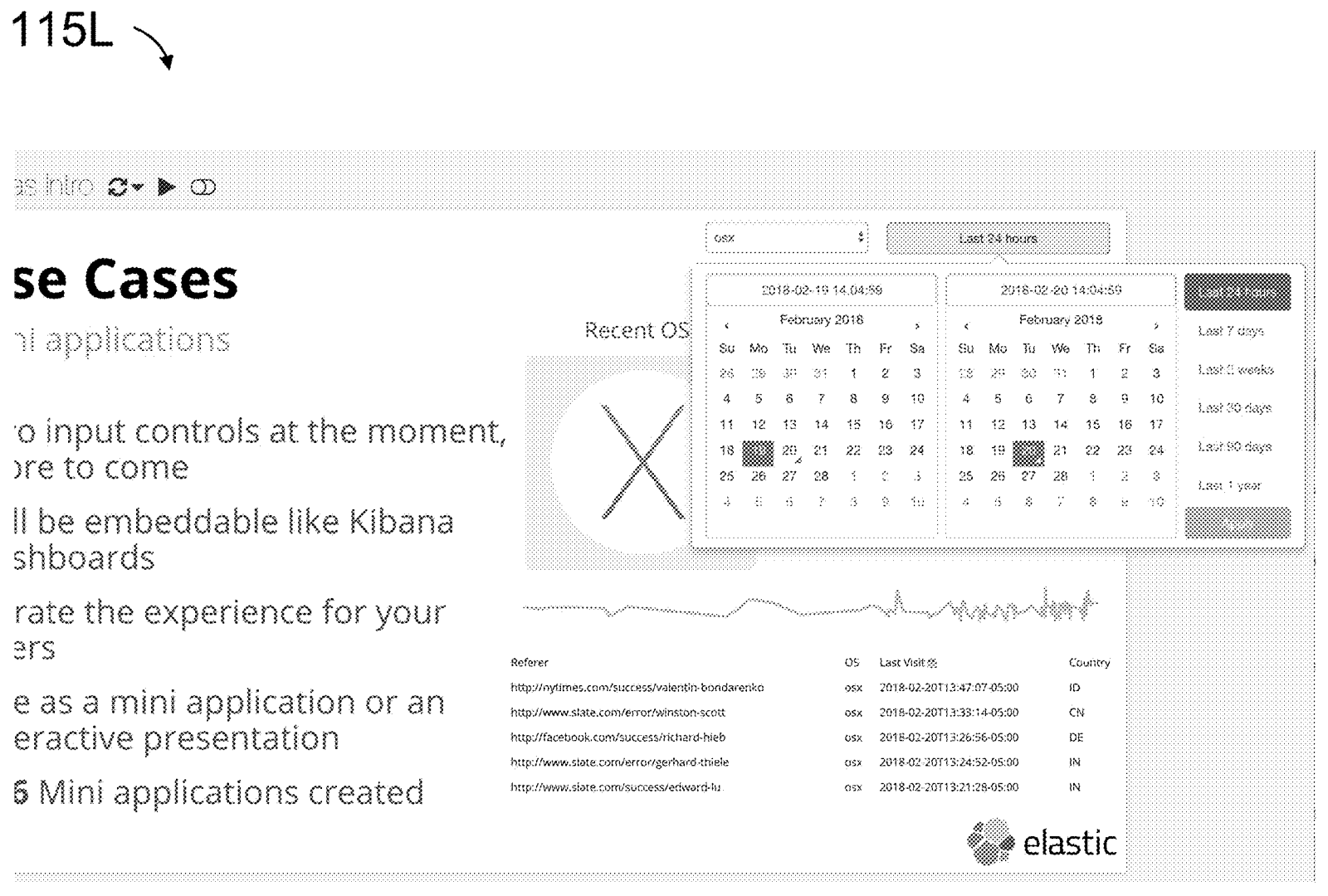
Figure 2M:
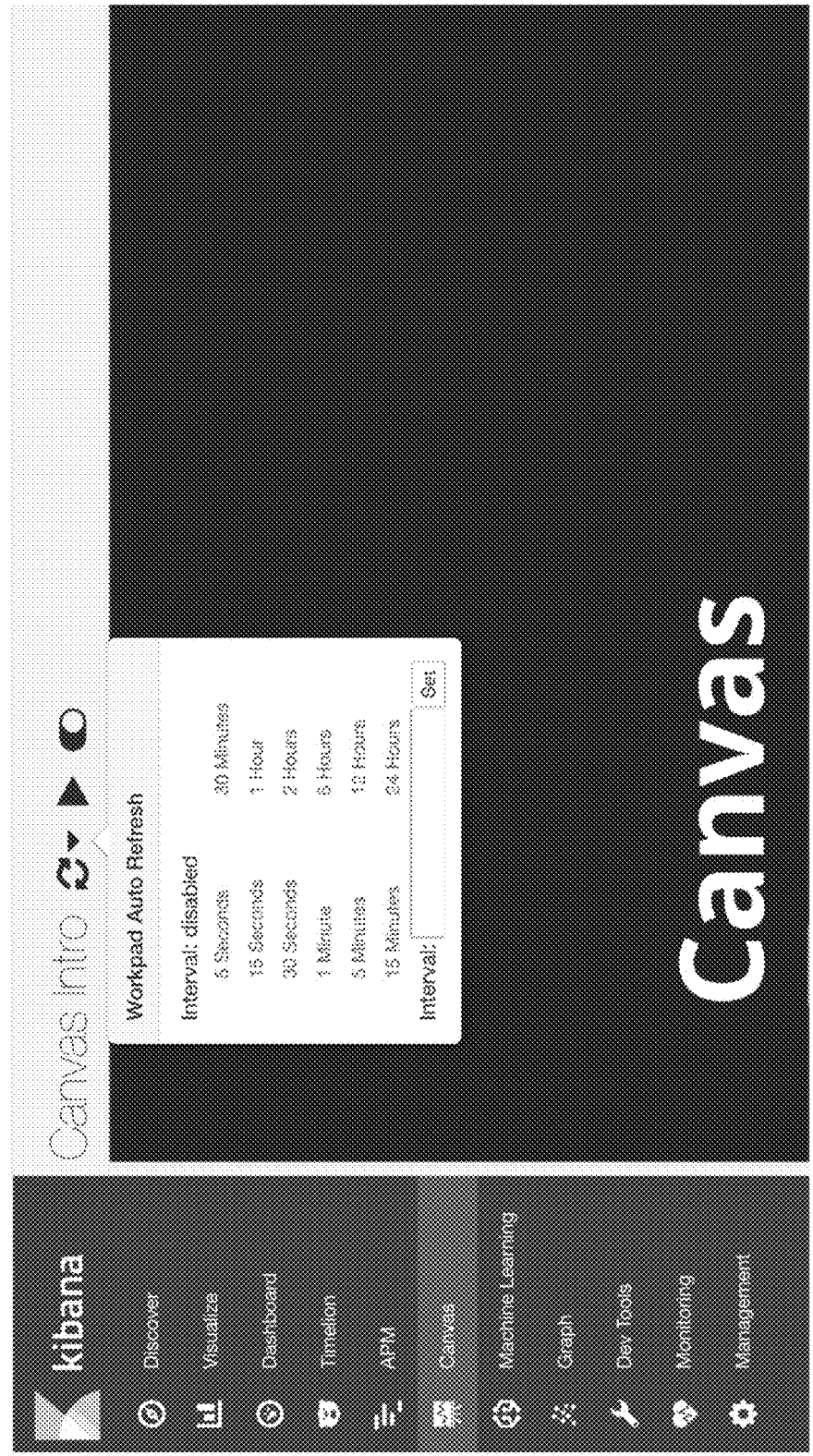
Figure 2N:
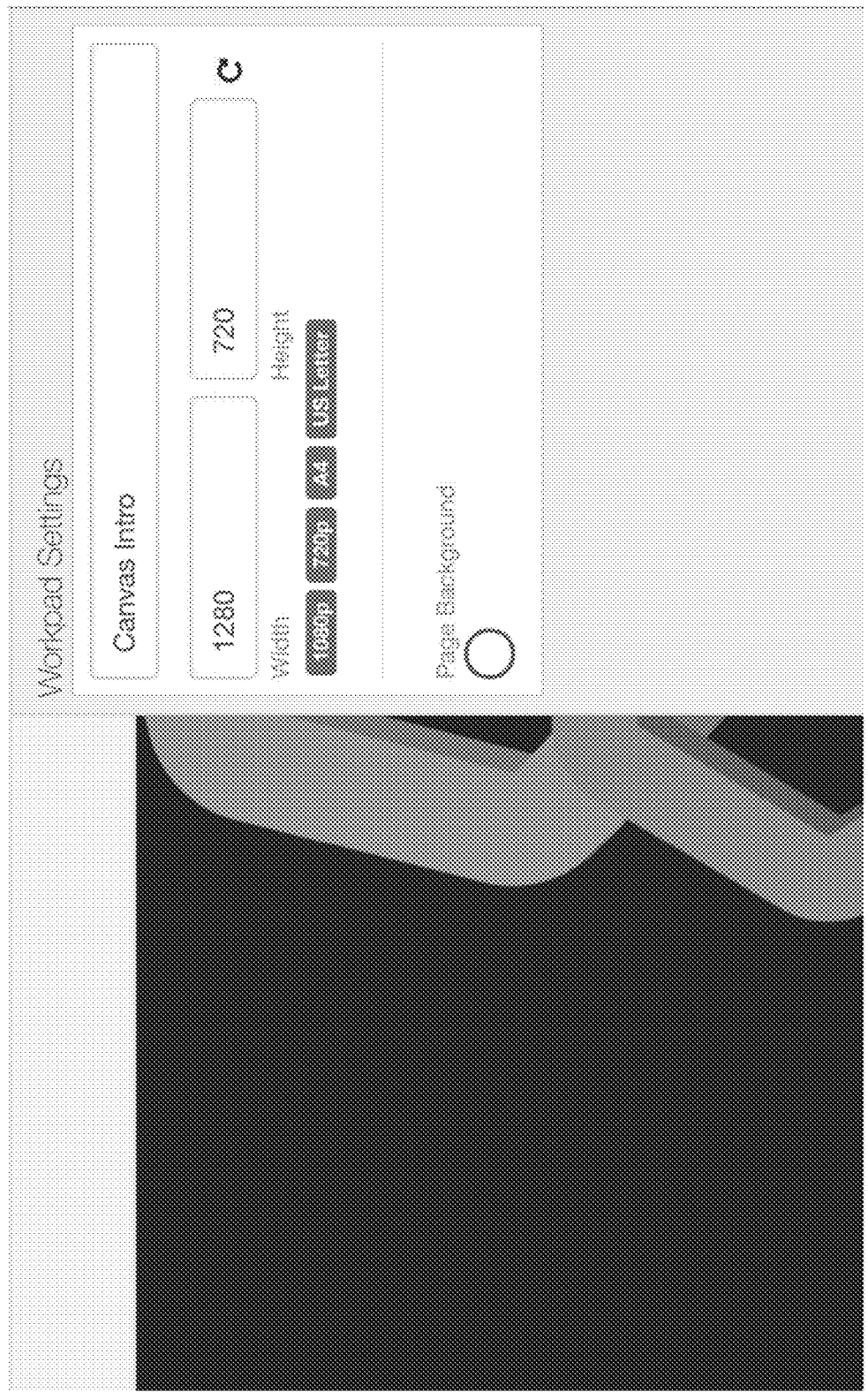
Figure 20:
Figure 2P:
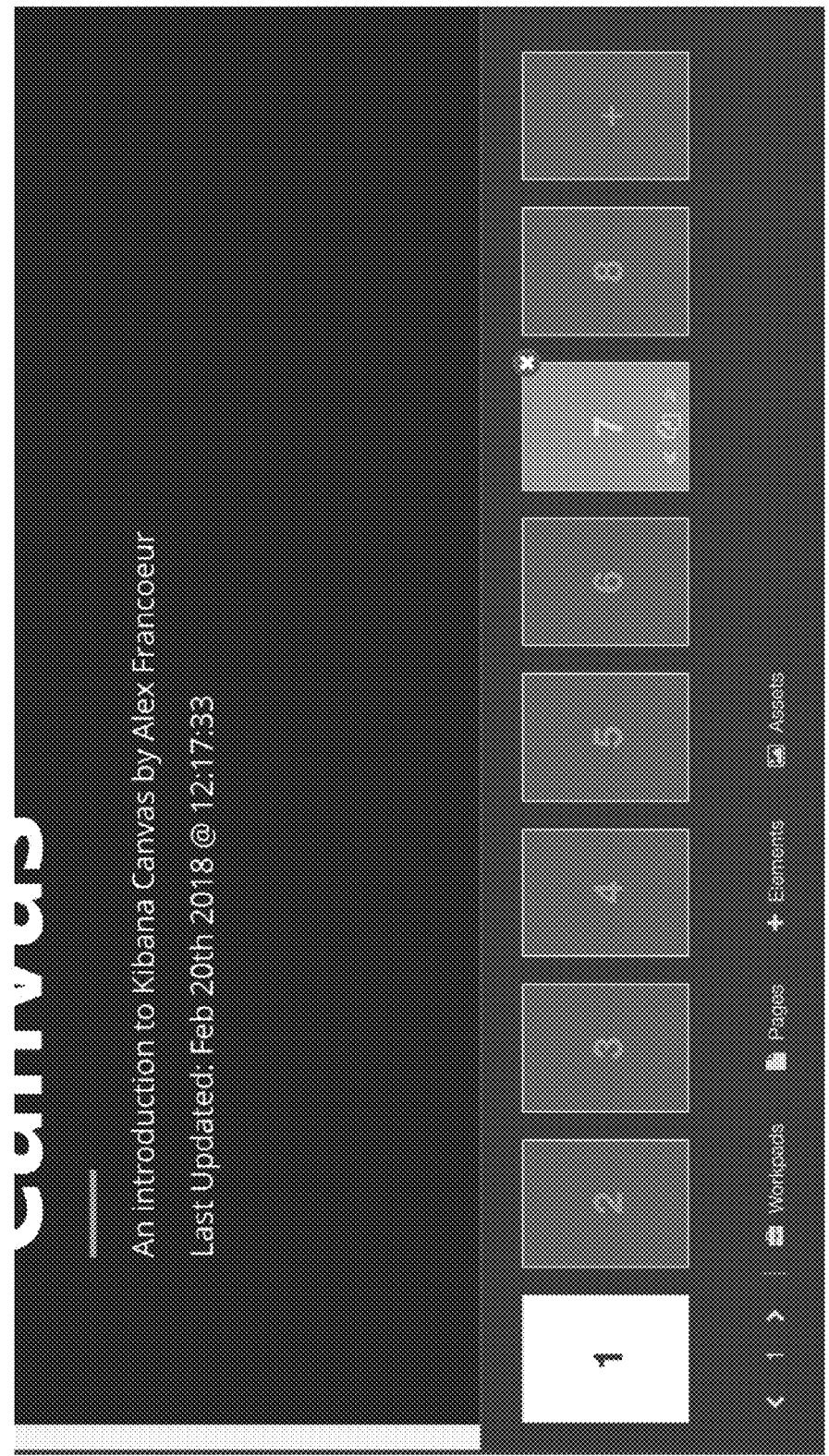
Figure 2Q:
Figure 4A:
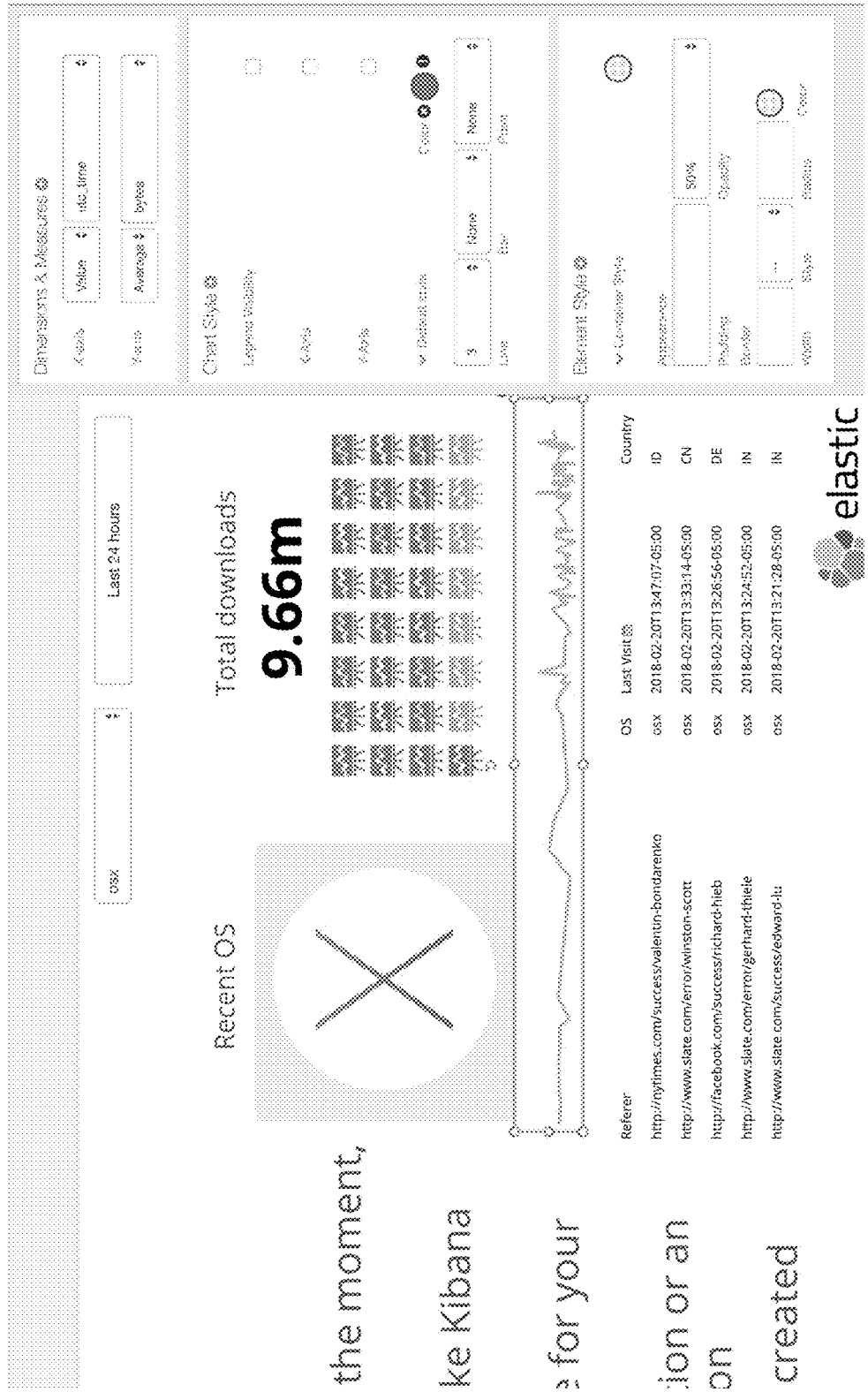
FIGS. 4A-4H show example relationships between graphical user interfaces (GUIs) and expressions, in accordance with various embodiments.
Figure 4B:
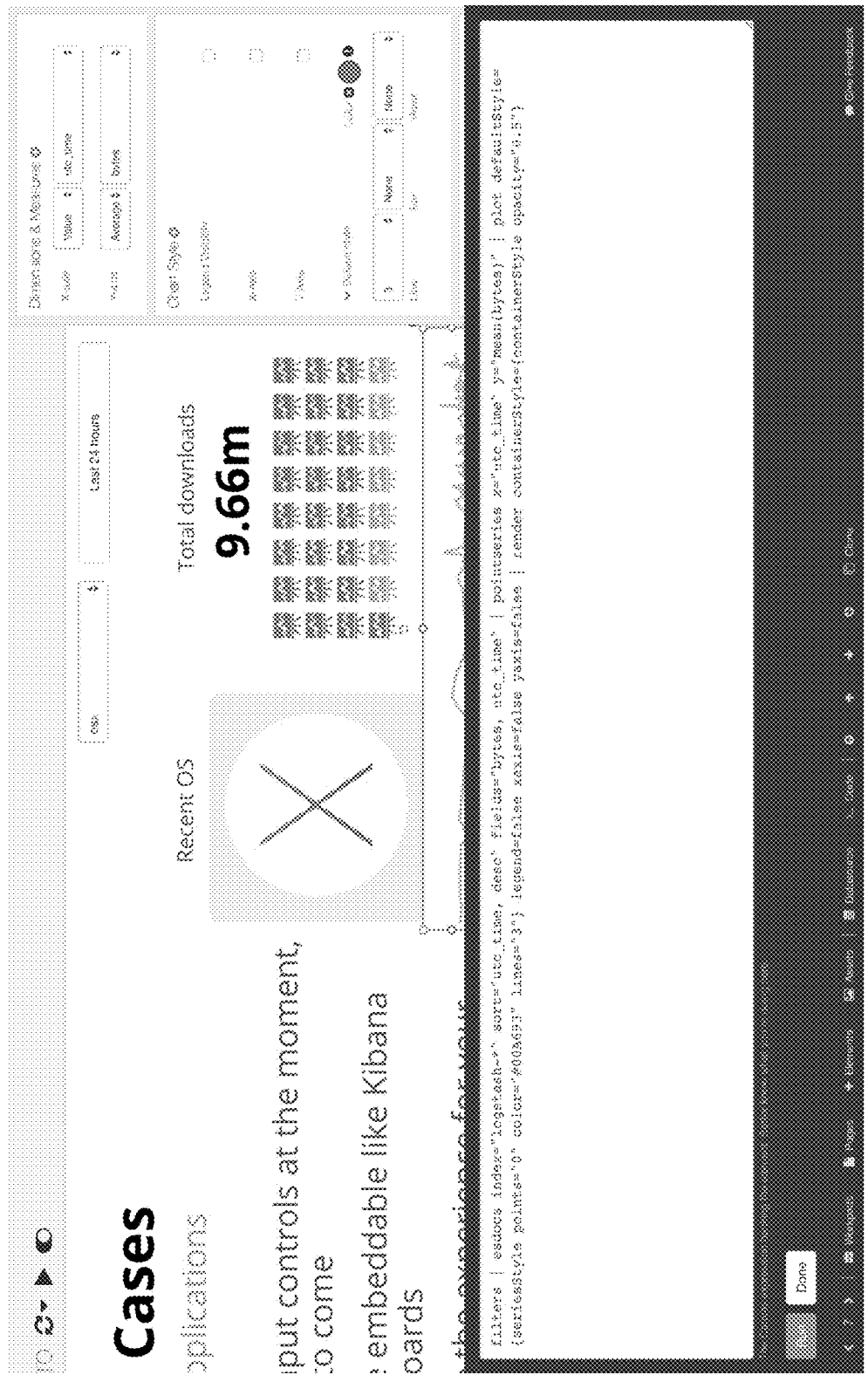
Figure 4C:
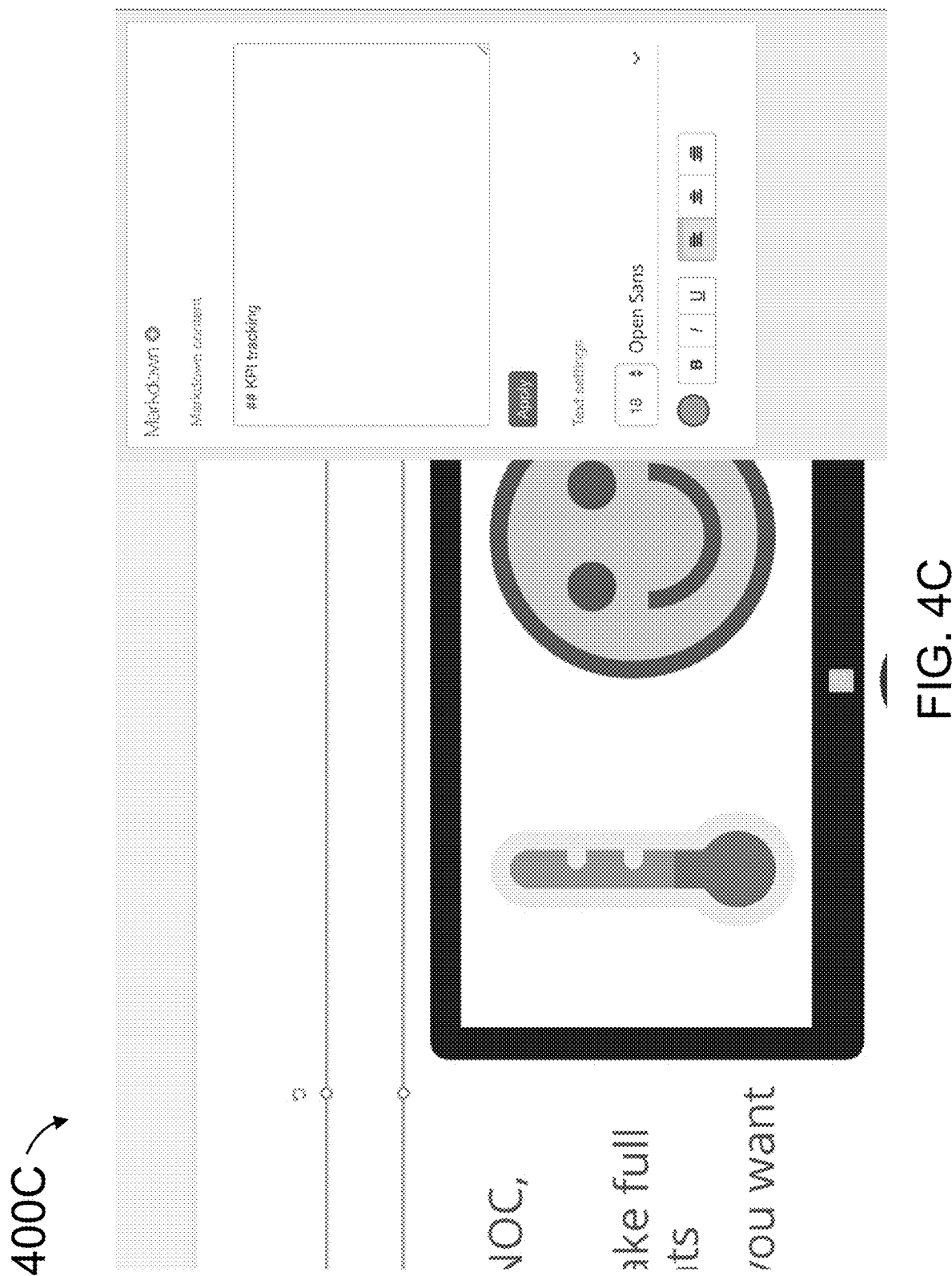
Figure 4D:
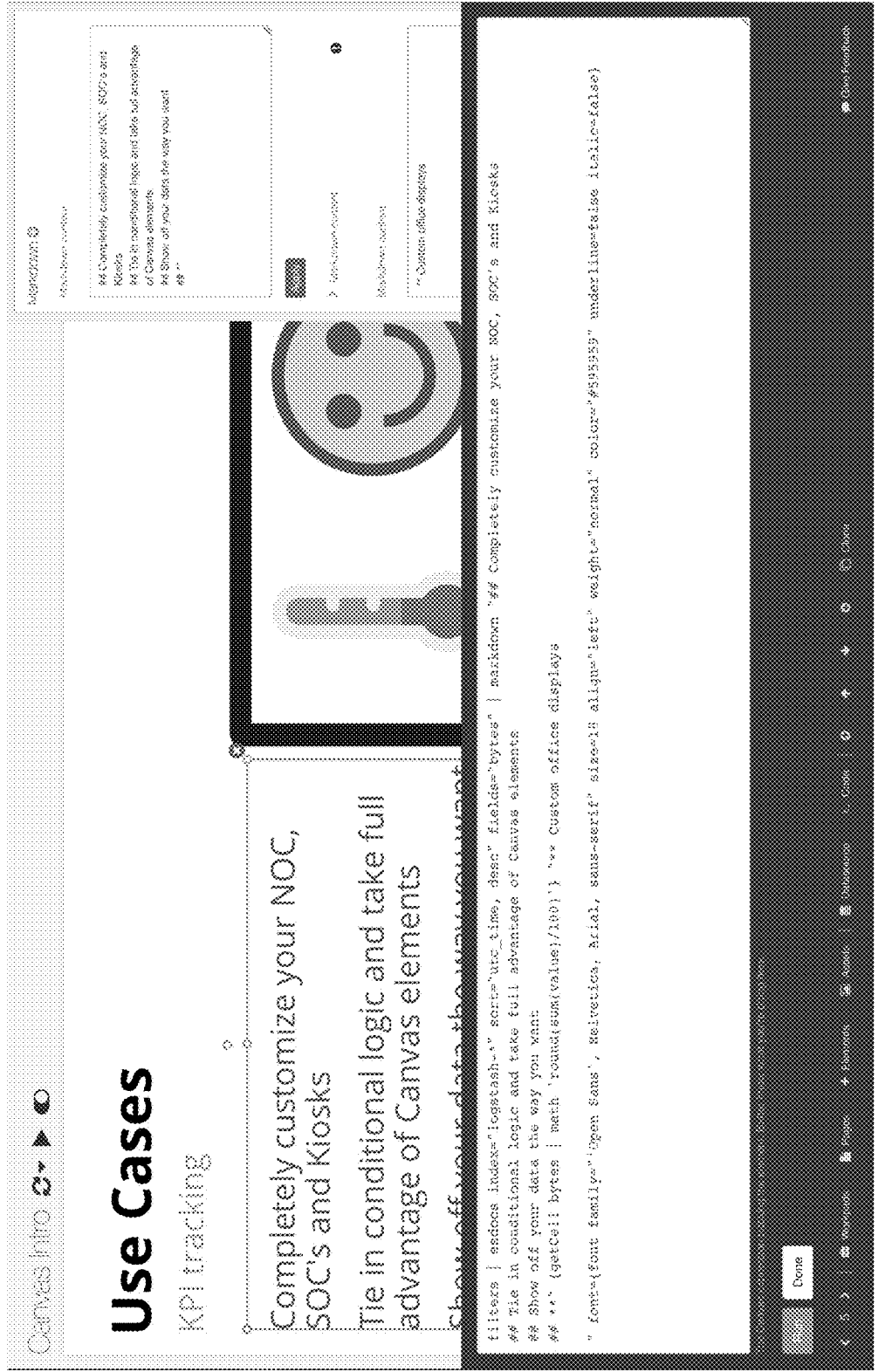
Figure 4E:
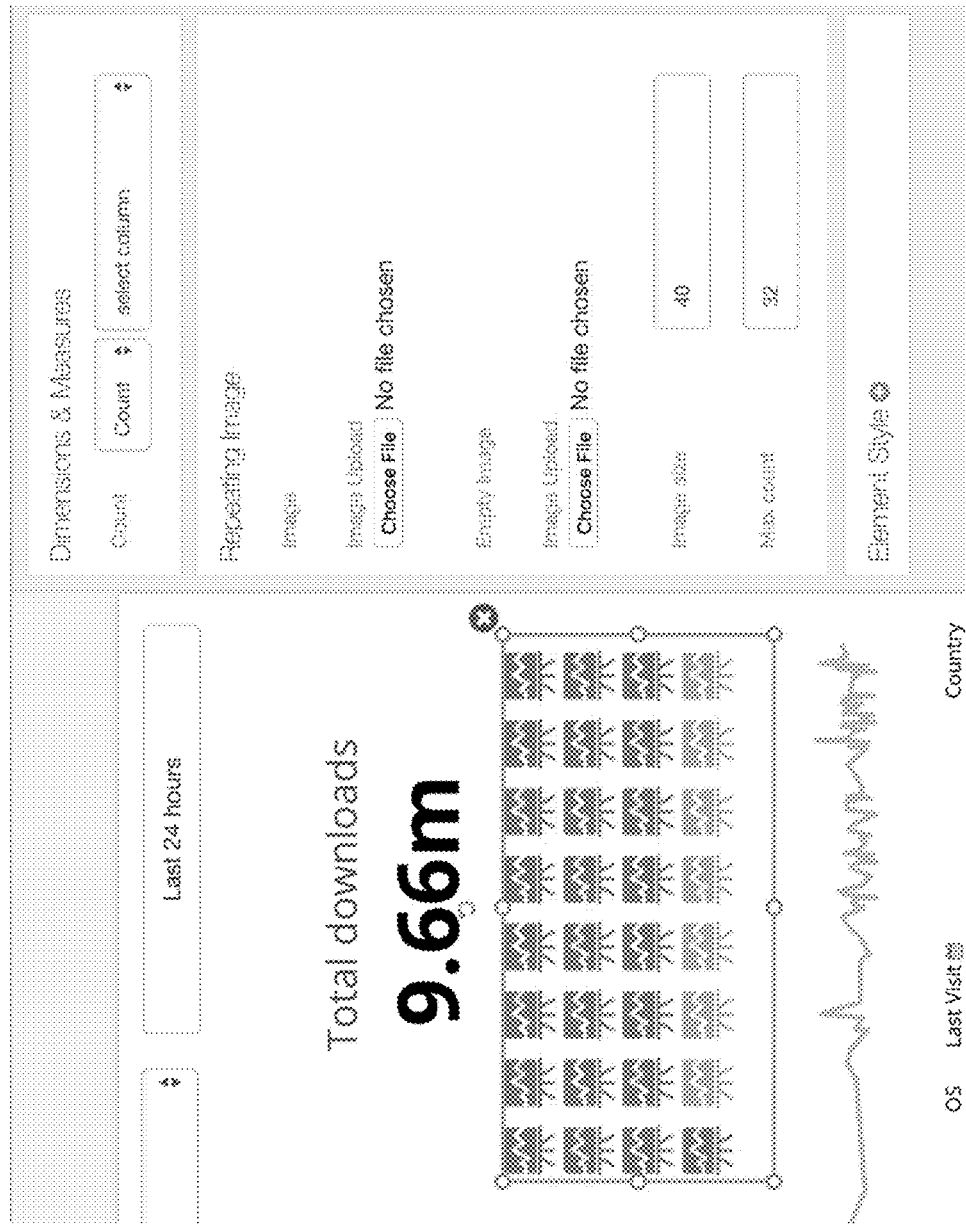
Figure 4F:
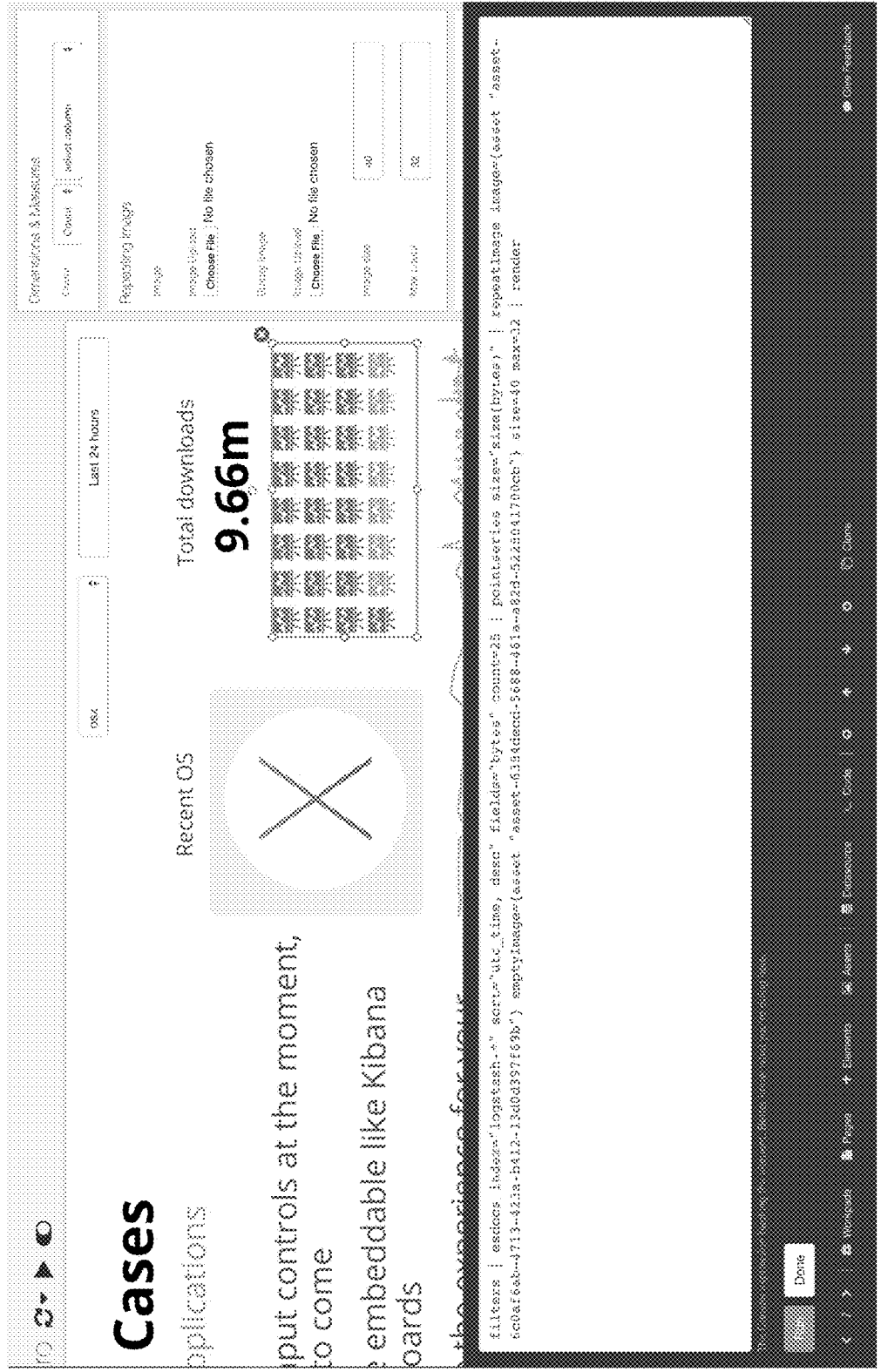
Figure 4G:
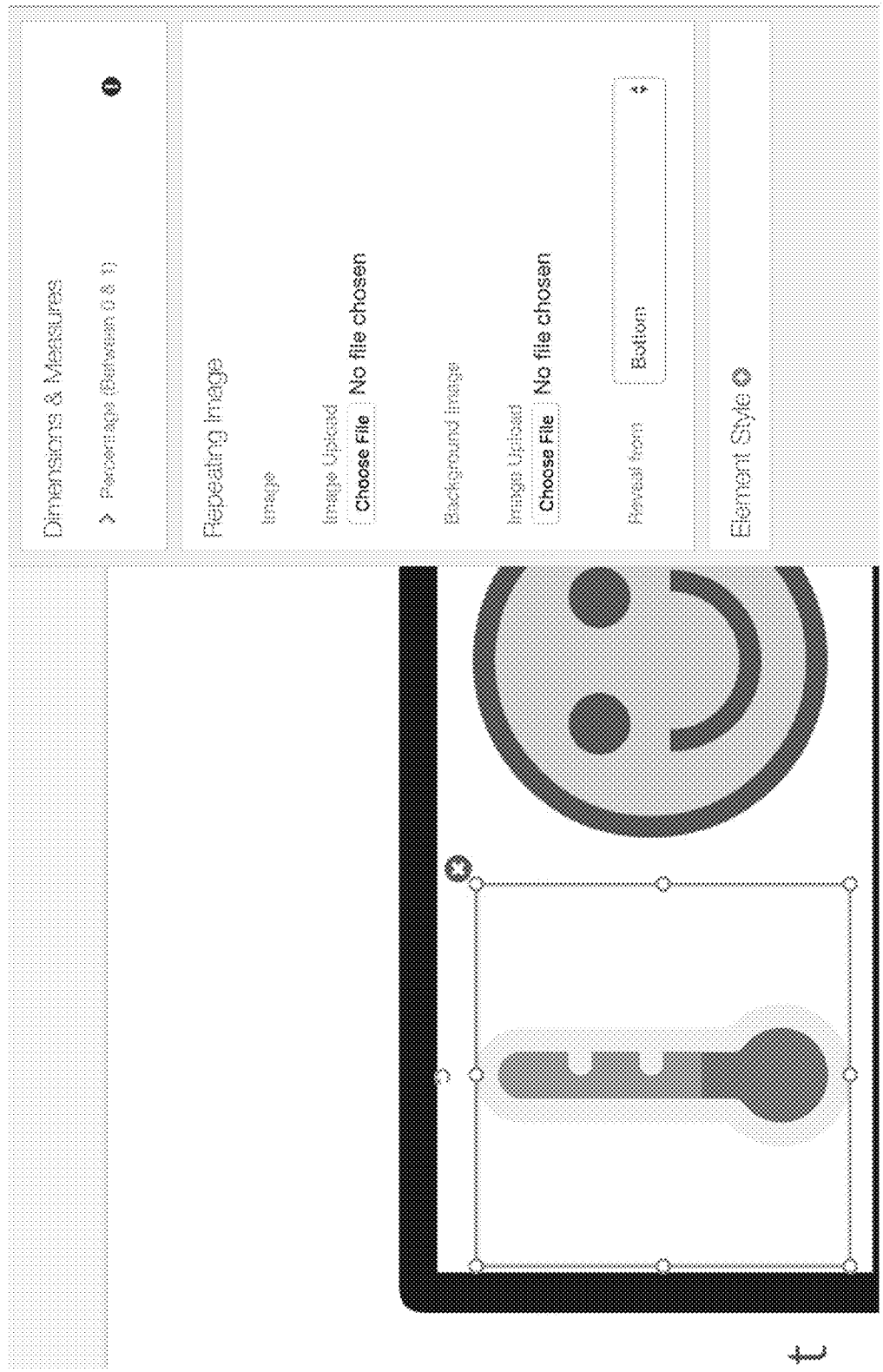
Figure 4H:
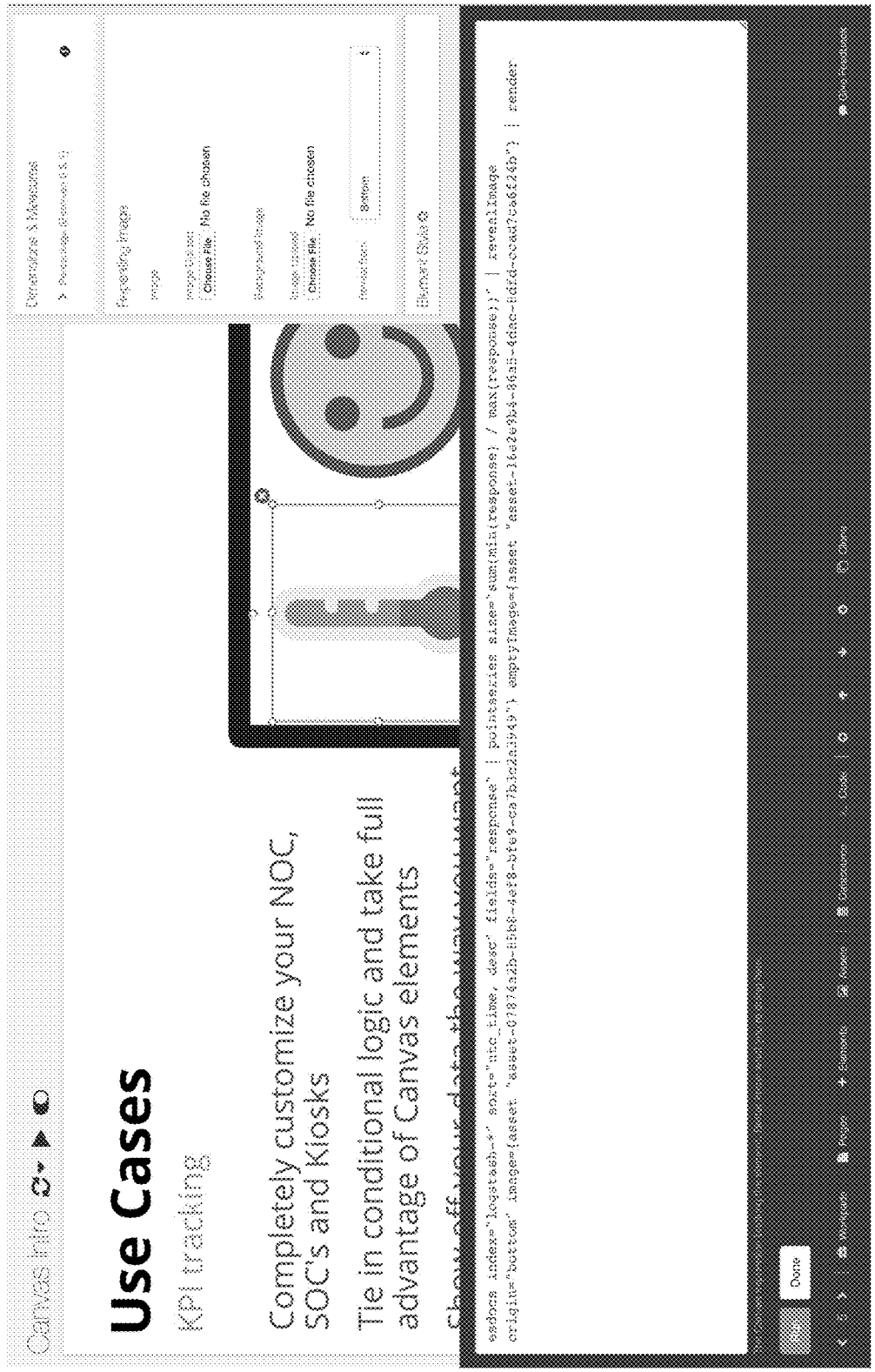

FIGS. 2B-2Q illustrate application 115B-115Q, which are non-limiting examples of application 115 (FIG. 2A) further depicting various embodiments of GUI 116 and components $220_A$-$220_G$. For illustrative purposes, FIGS. 2D-P include enlarged example views of particular features of application 115, wider views of which are shown in FIGS. 2B, 2C, and 2Q. For example, FIGS. 2D-2Q illustrate, among other features, assets and asset management, conditional image expression, data source preview, data source selection, filter drop-down menu, Elasticsearch (e.g., a search engine providing a distributed, multitenant-capable full-text search engine with an HTTP web interface and schema-free JSON documents) data source, element selection, full-screen mode, give feedback, time filter, workpad (e.g., space 210 in FIG. 2A) auto refresh, workpad configuration, workpad management, workpad pages, and workpad view mode.

FIG. 3 shows a non-limiting example, expression 300, of an expression. Each component of components $220_A$-$220_G$ (FIG. 2A) has a corresponding expression. Initially, when a component of components $220_A$-$220_G$ is created (e.g., using GUI 116 in FIG. 1), a corresponding expression is produced. The expression embodies characteristics of the component, such as a style, a data source (e.g., server 130 (FIG. 1)) from which data for the component is drawn, and the like.

For the purposes of illustration, expression 300 is divided into parts 310-350. Expressions can include a pipe-based syntax, where output from one of parts 310-340 flows to the next one of parts 320-350, respectively. A pipe is denoted by "|", which for illustrative purposes separates parts 310-350. Other symbols/character may be used to denote a pipe.

An expression can be an instruction in plain text run by interpreters 117 and 137 (FIG. 1). According to various embodiments, expressions include a function(s). Expressions can be processed anywhere an interpreter of interpreters 117 and 137 can operate, such as by whichever of interpreters 117 and 137 is convenient (e.g., more efficient, faster, etc.). Functions can have a context of "client" (browser), "server", and "common" (e.g., the function will be available on both the client and server). Most functions can be common, an exception being where avoiding problems introduced by running in the client (e.g., dealing with Cross-Origin Resource Sharing (CORS)) when making API calls, talking to a database, etc.) or on the server (e.g., using browser APIs, like geolocation, asking the user for input, etc.) would be advantageous. CORS is a mechanism that uses additional HTTP headers to let a user agent gain permission to access selected resources from a server on a different origin (domain) than the site currently in use.

For example, when data used by a component is not stored in client 110 and is available from server 130 (FIG. 1), then a portion of the expression associated with getting data (or a data source, e.g., part 310 of expression 300) is run by interpreter 137. By way of further non-limiting example, when data used by a component is cached in (or otherwise available from) client 110, then a portion of the expression (e.g., part 310 of expression 300) is run by interpreter 117. Retrieving data from server 130 (e.g., interpreter 137 evaluates some of an expression) every time a style of and not data for a component is changed is slow and inefficient, because using a copy of the data cached locally does not require a network request (e.g., going out over communications links 120) which can be slow.

Turning to expression 300, the interpreter (e.g., interpreters 117 and 137) starts at part 310 and looks up what esdocs requires as context, which is usually the output of the previous function. If the function is the first one in the expression, the context is null, unless cast to something else. In part 310, esdocs is the first function in expression 300, so there's no context. The esdocs function can require a context of type query. The interpreter looks at the null value and creates the query type from null, resulting in an object like {type: "query"}.

The interpreter (e.g., interpreters 117 and 137) then looks at the arguments for esdocs. If any of them are a sub-expression, it runs those sub-expressions. In part 310 there are no sub-expressions, just a plain string argument. The interpreter executes esdocs, receiving both context and the resolved values all of its arguments. So, the interpreter gets a query as context, and one argument telling it to retrieve @timestamp and bytes.

The interpreter (e.g., interpreters 117 and 137) continues to part 320 where it executes staticColumn, which creates a new column with a value that is the same for all rows. staticColumn accepts and outputs a datatable. In between "{" and "}" is a sub-expression. The interpreter executes the sub-expression before executing staticColumn. Each sub-expression is passed the same context that will eventually be given to staticColumn: the datatable output by esdocs. So, math accepts a datatable and, in this case, uses it to sum up all the values of a column.

Once the interpreter (e.g., interpreters 117 and 137) has run all of the sub-expressions, it checks the outputs of each and casts them as necessary for the types that each argument has declared it requires. In this case the value argument accepts string, number, null, or boolean. The interpreter executes staticColumn, which outputs a new datatable with a new column called total containing the sum of all values in the bytes column for every row.

The interpreter (e.g., interpreters 117 and 137) proceeds to part 330 where it runs sleep. Sleep sleep can introduce a delay into the running of expression 300. Sleep can also receive and pass on the datatable from part 320.

The interpreter (e.g., interpreters 117 and 137) goes on to part 340 having mapColumns. The interpreter runs partial expression getColumn @timestamp|rounddate 'YYYY-MM-DD' (see 350). MapColumns then gets the resulting output of rounddate and uses the output to do some date rounding. In some embodiments, partial expressions are denoted by the "${" and "}" syntax. Partial functions can be passed into the parent function (whereas sub-expressions can be interpreted inline).

The GUI of application 115 can receive the datatable and determine it does not know what to do with it. The GUI can then passes the datatable back to the interpreter (e.g., interpreters 117 and 137) as context, and with a function of render. This results in the datatable being wrapped with a render object, which tells the GUI to show it as an HTML table.

In some embodiments, changes made to an expression also change the corresponding of components $220_A$-$220_G$ (FIG. 2A). In this way, the style and/or data in a component of components $220_A$-$220_G$ can be manipulated in a manner not easily expressed by the GUI.

In some embodiments, changing/updating a characteristic/feature of a component from a user interface (UI), such as a GUI, updates an abstract syntax tree (AST) (described further below), the AST updates the expression. In various embodiments, changing/updating an expression updates an AST, which updates the UI. Various combinations and permutations of sequences of making changes using the GUI and expression are possible. By way of non-limiting example, Expression→AST→UI→Updates via the UI→Updated AST→Updated Expression When the expression changes, it is passed back through the interpreter (e.g., interpreter 117 or 137 in FIG. 1) to produce the updated output. In addition, the application (e.g., application 115) can perform some caching so that it only re-executes the part of the expression that changed, and all the functions that follow it.

For example in expression 500A in FIG. 5A of referenced application Ser. No. 15/907,274, when the user uses the UI to change the color, the results of "demodata|pointseries" do not run again, so that context is pulled from a cache of the data and provided to plot directly as context, and rest of the expression (only "render here") is executed normally, getting the context of the function before it. The user can edit the expression directly as well using the "code" section at the bottom. When done this way, then entire expression can be re-run without any caching.

FIGS. 4A-H illustrate non-limiting examples of relationships/feedback between a GUI and an expression which configure a component. For example, FIGS. 4A and B depict a coordinate plot, FIGS. 4C and D markdown, FIGS. 4E and F repeating image, and FIGS. 4G and H reveal image. For illustrative purposes, FIGS. 4A-H include enlarged example views, wider views of which are shown in FIGS. 2B and C.

Figure 5:
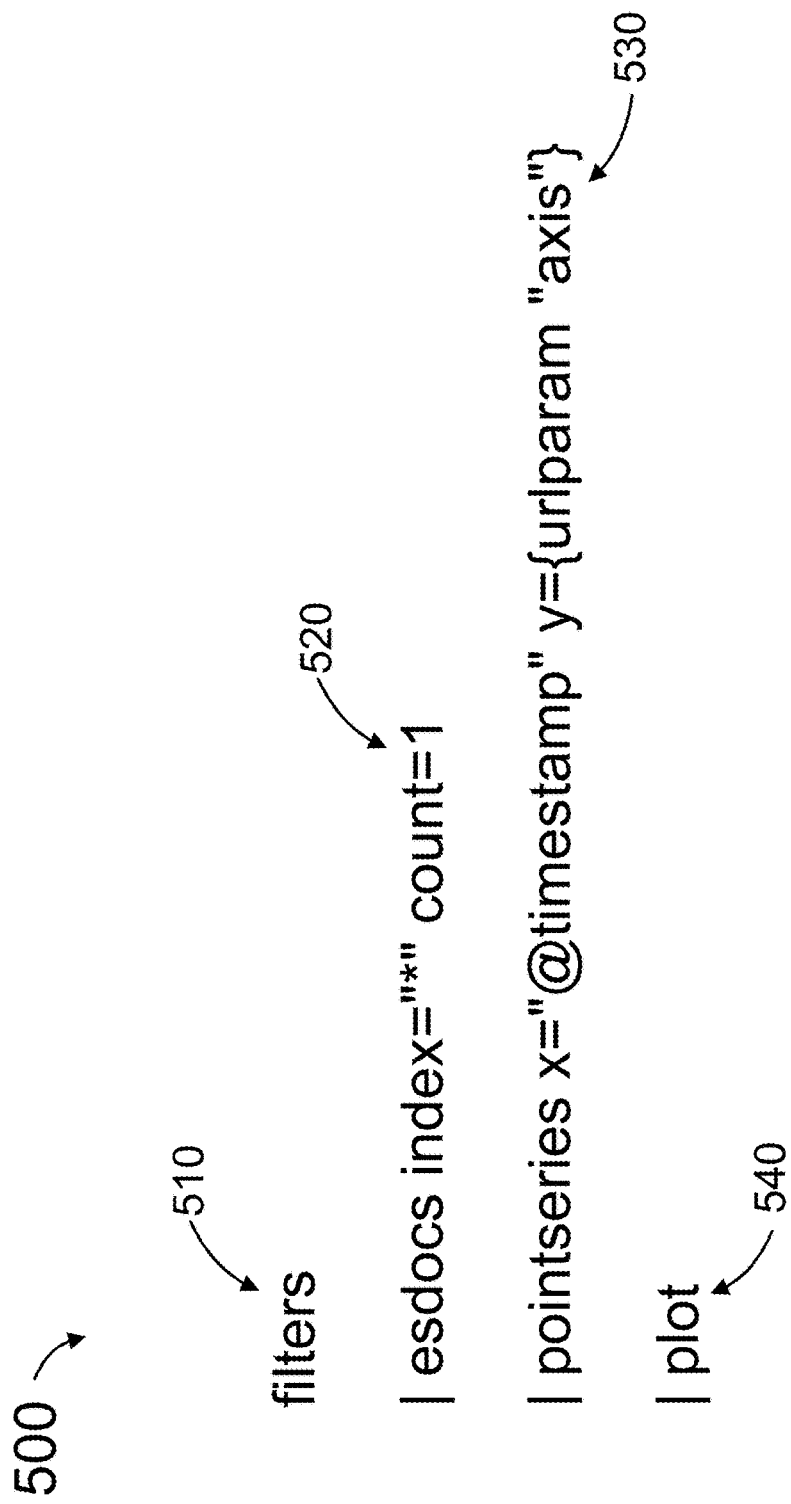
FIG. 5 is an example expression, according to some embodiments.

FIG. 5 shows a non-limiting example, expression 500, of an expression. Expression 500 includes parts 510-540. Expression 500 starts on the client with the "filters" function that gets values from filter elements in the workpad. Expression 500 then moves to the server to query to a search engine (e.g., Elasticsearch) using the "esdocs" function. For the next function, the interpreter (on the client) starts with the subexpression that uses the "urlparam" function, which reads a value out of the Uniform Resource Locator (URL) in the browser's address bar. It then passes that value and the context back to the server to execute the "pointseries" function. Lastly, since plot is a common function, the execution stays on the server, and the final output is sent back to the client to render the visualization.

Another non-limiting example of an expression with the "esdocs" function, such as described in relation to FIG. 3, is:

*esdocs|staticColumn myLocation fn={location}*

In this case the interpreter can start executing on the client, as it typically does. It will find that "esdocs" is not available on the client, but is available on the server. Execution will move to the server. Before executing "staticColumn," its arguments will be resolved. While trying to resolve "fn" the interpreter on the server will find location, the first (and only) function in the subexpression, unavailable on the server, but available on the client. An interpreter will be started on the client with the context provided by "esdocs," but with only location to be executed. The result of the sub-expression will be returned to the server, which will execute "staticColumn" with it as the value for the "fn" argument. The result of staticColumn will be returned to the client.

In the above example, the interpreter has moved from the client to the server. It has then forked back to the client to run location, while keeping the interpreter on the server running. It has retrieved data from the client and resumed the server interpreter before returning the result to the client.

Figure 6:
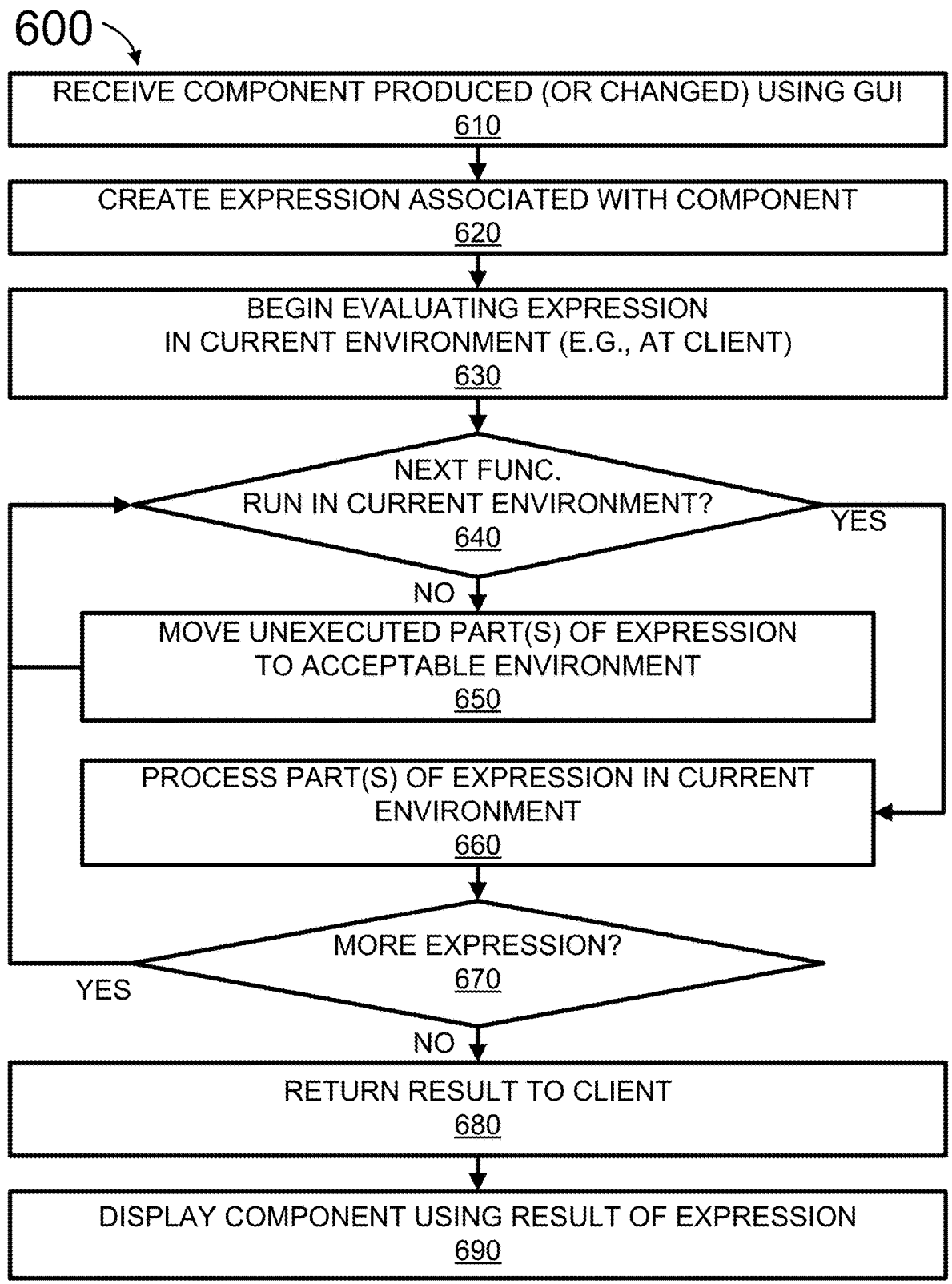
FIG. 6 is simplified flow diagram of a method for instantiating a component, according to various embodiments.

FIG. 6 shows method 600 for data visualization using client-server independent expressions, according to some embodiments. Method 600 can be performed by system 100 (and its constituents) as described in relation to FIGS. 1 and 2A-G. Method 600 can commence at step 610, where a component is received (e.g., at a client). For example, a component of components $220_A$-$220_G$ (FIG. 2A) is received using GUI 116 (FIG. 1). The component can include style characteristics (e.g., size, location, orientation, font, font color, background color, border, etc.) and a data source (e.g., default data stored in computing device 100, data stored in server 130 (FIG. 1), etc.).

At step 620, an expression describing (corresponding to) the component can be created (e.g., at the client). For example, the expression can have at least some of the characteristics of expressions described in relation to FIG. 3.

At step 630, the expression can begin to be evaluated (e.g., at the client). For example, interpreter 117 (FIG. 1) can start executing the expression, such as was described in relation to FIG. 3.

At step 640, a determination is made whether the next function in the expression can run in the current environment (e.g., client, server, and other environment). In some embodiments, the determination is whether the function for retrieving or processing data is available locally or in another environment. When the next function in the expression cannot run in the current environment, method 600 can proceed to step 650. When the next function in the expression can run in the current environment, method 600 can continue to step 660. In some embodiments, step 640 is performed by interpreter 117, such as when the current environment is the client.

At step 650 the unexecuted parts of the expression, including the next function, can be moved to an acceptable environment. For example, when the current environment is a client and the acceptable environment is a server, an interpreter is spun up on a server to process the unexecuted parts of the expression including the next function.

In some embodiments, the interpreter is interpreter 137 (FIG. 1). For example, a network socket in server 130 is listening/waiting for execution of the expression to move from client 110 to server 130 (FIG. 1) and server 130 launches interpreter 137 when initiated by (client) application 115. A network socket can be an internal endpoint for sending or receiving data at a single node (e.g., server 130) in a computer network (e.g., communications links 120). A network socket can represent the endpoint in networking software (e.g., a protocol stack), such as an entry in a table (e.g., including communication protocol, destination, status, etc.).

At step 660, the unexecuted parts of the expression can be processed in the current environment (e.g., client, server, and the like) by the interpreter (e.g., interpreters 117 and 137 in FIG. 1). In some embodiments, the interpreter (in the current environment) tries to evaluate (all) the remaining (unexecuted) parts of the expression. For example, the interpreter (in the current environment) will process the remaining parts of the expression until it encounters a function that cannot be run in the current environment (at which point an evaluation such as at step 640 can be performed).

At step 670, a determination is made whether there are further parts of the expression to execute (e.g., there are unexecuted parts of the expression. When there is more of the expression to run, method 600 can proceed to step 640. When there is no more of the expression to run, method 600 can continue to step 660. In some embodiments, step 640 is performed by interpreter 137, such as when the current environment is the server.

At step 680, the result(s) from the processing at step 660 can be returned to the client. For example, server 130 sends the retrieved data to client 110, where it can be stored (cached).

At step 690, the component can be rendered/displayed on the client. For example, GUI 116 (FIG. 1) can display a component of components $220_A$-$220_G$ in space 210 (FIG. 2A) using the results from the executed expression.

Figure 7:
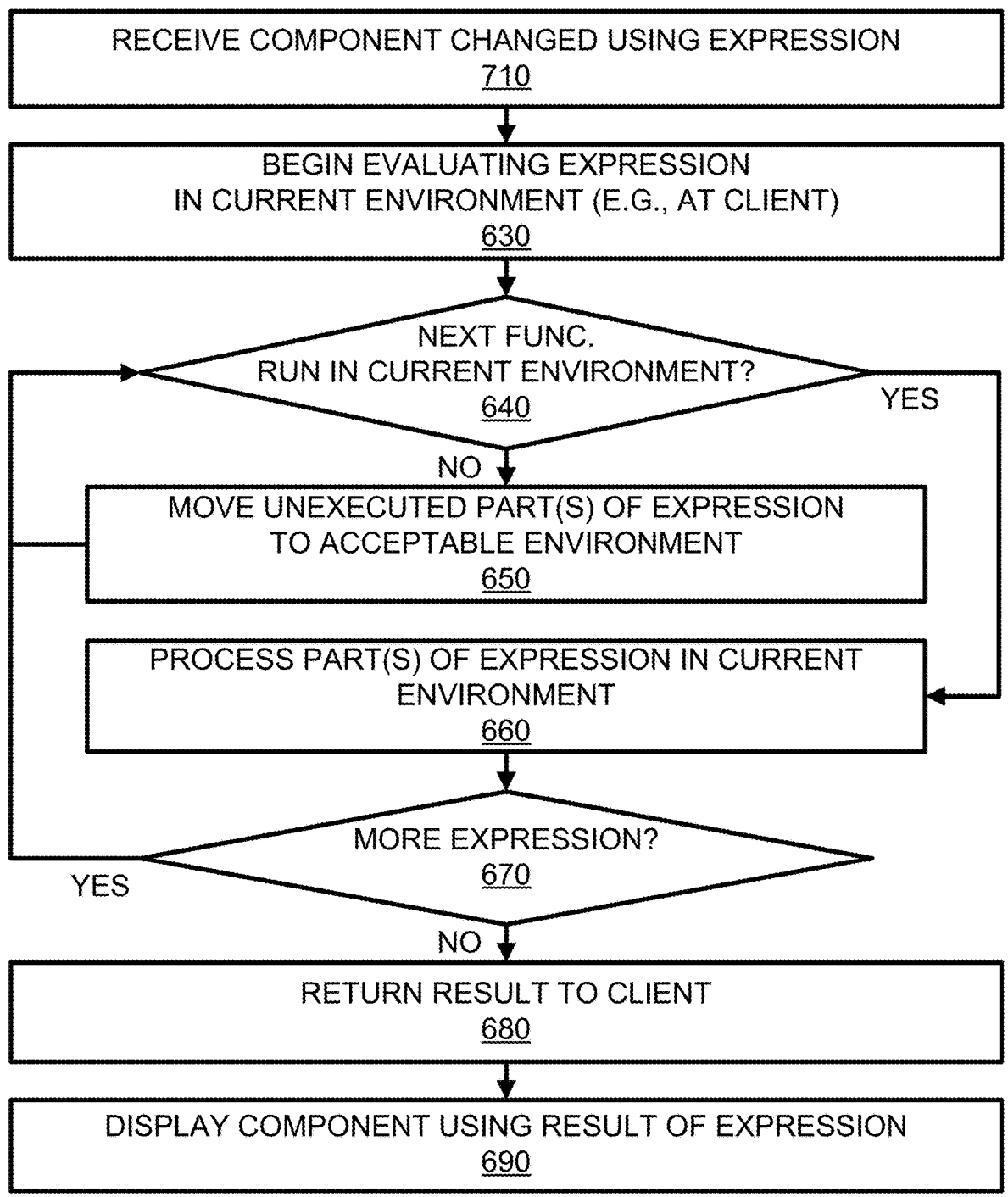
FIG. 7 is a simplified flow diagram of a method for data visualization using client-server independent expressions, in accordance with some embodiments

FIG. 7 shows method 700 for data visualization using client-server independent expressions, in accordance with some embodiments. Method 700 can be performed by system 100 (and its constituents) as described in relation the FIGS. 1 and 2A-G. Additionally, method 700 may be performed after method 400 (FIG. 4) is performed.

Method 700 can commence at step 710, where a component changed using an expression is received (e.g., at a client from a user). For example, a user can change a style (e.g., data and/or data source used, content type (e.g., text, image, chart, etc.), type or plot/chart, color, font, etc.) and/or data of component. By way of further non-limiting example, the user can affect the change editing the expression corresponding to the component.

Steps 630-690 are as described in relation to FIG. 6.

Figure 8:
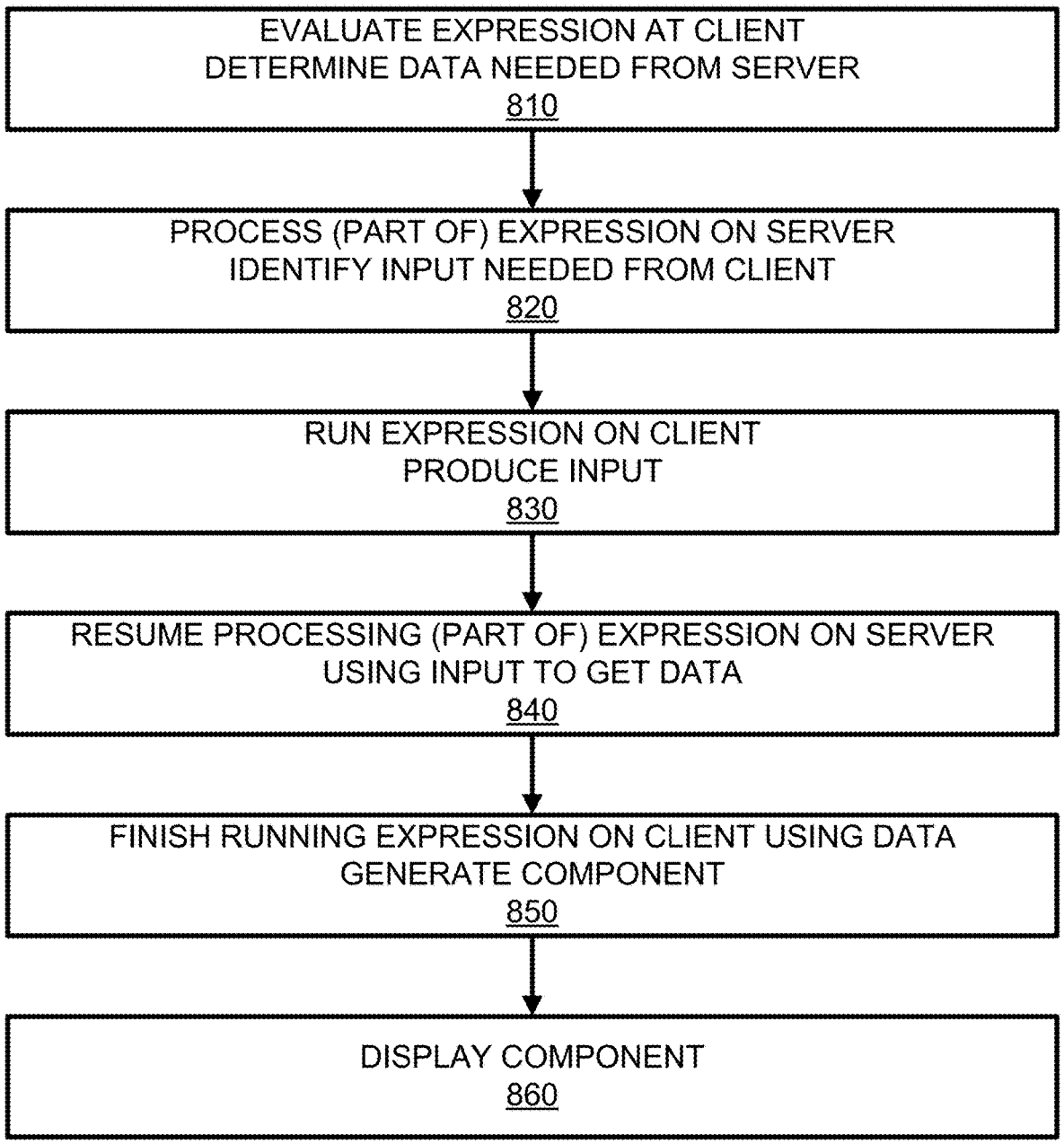
FIG. 8 is simplified flow diagram of a method for data visualization using client-server independent expressions, in accordance with various embodiments.

FIG. 8 is a simplified flow diagram showing method 800 for data visualization using client-server independent expressions, according to various embodiments. Method 800 can be performed by system 100 (and its constituents) as described in relation the FIGS. 1 and 2A-G. Method 800 may be performed after methods 600 and/or 700 (FIG. 7) are performed. Method 800 can commence at step 810, where an expression is evaluated and data not available locally is indicated.

At step 820, an interpreter is spun up on a server to process a portion of the expression (e.g., concerned with getting data). In some embodiments, the interpreter is interpreter 137 (FIG. 1). For example, a network socket in server 130 is listening/waiting for execution of the expression to move from client 110 to server 130 (FIG. 1) and server 130 launches interpreter 137 when initiated by (client) application 115. A network socket can be an internal endpoint for sending or receiving data at a single node (e.g., server 130) in a computer network (e.g., communications links 120). A network socket can represent the endpoint in networking software (e.g., a protocol stack), such as an entry in a table (e.g., including communication protocol, destination, status, etc.).

Also at step 820, the interpreter determines input from the client (e.g., client 110 in FIG. 1)) is needed to process the expression. For example, user input is needed to process the expression. By way of further non-limiting example, a location of client 110 is needed, such as to identify restaurants, entertainment, and the like within a predetermined distance from client 110, while server 130 is in a different geographic region (e.g., city, county, state/province, country, continent, etc.) from client 110. Further at step 820, the interpreter processes as much of the expression as possible (without the needed input) and then execution of the expression is turned over to the client.

At step 830, the client (e.g., interpreter 117 in FIG. 1) resumes processing the expression to determine the input needed. For example, the user input is received. By way of further non-limiting example, the location of client 110 is determined (e.g., using GPS, Wi-Fi, etc.). Further at step 830, execution of the expression is turned over to the server with the needed input.

At step 840, the server (e.g., interpreter 137 in FIG. 1) continues processing the expression with the needed input to produce the data specified by the expression. Further at step 840, execution of the expression is turned over to the client with the produced data.

At step 850, the client (e.g., interpreter 117 in FIG. 1) finishes executing the expression to produce the component.

At step 860, the component is displayed (e.g., by application 115 in FIG. 1).

Execution of the expression can be at one or more other computing environment in alternative or in addition to the server, such as other servers for different data, for processing power (e.g., number crunching), and the like.

FIG. 9 illustrates an exemplary computer system (or computing system) 900 that may be used to implement some embodiments of the present invention. The computer system 900 in FIG. 9 may be implemented in the contexts of the likes of computing systems, networks, servers, and combinations thereof. The computer system 900 in FIG. 9 includes processor unit(s) 910 and main memory 920. Main memory 920 stores, in part, instructions and data for execution by processor unit(s) 910. Main memory 920 stores the executable code when in operation. In some embodiments, main memory 920 includes various combinations and permutations of dynamic random-access memory (DRAM) and static random-access memory (SRAM).

The computer system 900 in FIG. 9 further includes a mass data storage 930, portable storage device 940, output devices 950, user input devices 960, a graphics display system 970, and peripheral device(s) 980.

The components shown in FIG. 9 are depicted as being connected via a single bus 990. The components may be connected through one or more data transport means. Processor unit(s) 910 and main memory 920 are connected via a local microprocessor bus 990, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine and/or container operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for data visualization comprising:
    receiving from a user via a graphical user interface a selection of a type of component, a data source from which data for the component is drawn, and style characteristics for the component, the style characteristics including at least size, location, and orientation of the component;
    based on the selection, creating an expression describing the component including a description of at least the data source for the component and the style characteristics for the component;
    evaluating at a client coupled to a server the expression describing the component, the evaluating including determining that certain data is needed from the server;
    executing at the server a portion of the expression including determining input is needed from the client;
    in response to the server determining that user input from the client is needed, executing at the client the expression including getting the user input and providing the user input from the client to the server;
    in response to receiving the user input from the client, resuming execution at the server of the portion of the expression using the user input to produce particular data specified by the expression and providing the particular data from the server to the client;
    executing at the client the expression using the particular data from the server to produce the component; and
    displaying the component.

2. The method of claim 1, wherein the component is at least one of text, graphics, and a chart.

3. The method of claim 2, wherein the chart is at least one of a line plot, a scatter plot, a column chart, a bar chart, a pie chart, an area chart, a box plot, a surface chart, a doughnut chart, a bubble chart, and a radar chart.

4. The method of claim 1, wherein the expression is in plain text.

5. The method of claim 4, wherein the expression uses a pipe-based syntax.

6. The method of claim 5, wherein the expression is divided into a plurality of parts, such that an output from a first part of the plurality of parts is an input to a second part of the plurality of parts.

7. The method of claim 6, wherein a third part of the plurality of parts includes a first function and a sub-expression, the sub-expression including a second function, the second function being processed before the first function.

8. The method of claim 1, wherein the expression also describes, a function, a font, a color, and the type of the component.

9. The method of claim 1, wherein the executing at the server a portion of the expression commences when the server receives a signal from the client at a socket of the server.

10. The method of claim 1, wherein the client includes a web browser and a plug-in for the web browser for the evaluating at the client, and the executing at the client.

11. A system for data visualization comprising:
    a processor; and
    a memory communicatively coupled to the processor, the memory storing instruction executable by the processor to perform a method comprising:
        receiving from a user via a graphical user interface a selection of a type of component, a data source from which data for the component is drawn, and style characteristics for the component, the style characteristics including at least size, location, and orientation of the component;
        based on the selection, creating an expression describing the component including a description of at least the data source for the component and the style characteristics for the component;
        evaluating at a client coupled to a server the expression describing the component, the evaluating including determining that certain data is needed from the server;
        executing at the server a portion of the expression including determining input is needed from the client;
        in response to the server determining that user input from the client is needed, executing at the client the expression including getting the user input and providing the user input from the client to the server;
        in response to receiving the user input from the client, resuming execution at the server of the portion of the expression using the user input to produce particular data specified by the expression and providing the particular data from the server to the client;
        executing at the client the expression using the particular data from the server to produce the component; and
        displaying the component.

12. The system of claim 11, wherein the component is at least one of text, graphics, and a chart.

13. The system of claim 12, wherein the chart is at least one of a line plot, a scatter plot, a column chart, a bar chart, a pie chart, an area chart, a box plot, a surface chart, a doughnut chart, a bubble chart, and a radar chart.

14. The system of claim 11, wherein the expression is in plain text.

15. The system of claim 14, wherein the expression uses a pipe-based syntax.

16. The system of claim 15, wherein the expression is divided into a plurality of parts, such that an output from a first part of the plurality of parts is an input to a second part of the plurality of parts.

17. The system of claim 16, wherein a third part of the plurality of parts includes a first function and a sub-expression, the sub-expression including a second function, the second function being processed before the first function.

18. The system of claim 11, wherein the executing at the server a portion of the expression commences when the server receives a signal from the client at a socket of the server.

19. A system for data visualization comprising:
    means for receiving from a user via a graphical user interface a selection of a type of component, a data source from which data for the component is drawn, and style characteristics for the component, the style characteristics including at least size, location, and orientation of the component;
    means for, based on the selection, creating an expression describing the component including a description of at least the data source for the component and the style characteristics for the component;
    means for evaluating at a client coupled to a server the expression describing the component, the evaluating including determining that certain data is needed from the server;

means for executing at the server a portion of the expression including determining input is needed from the client;
means for, in response to receiving user input from the client, resuming execution at the server of the portion of the expression using the user input to produce particular data specified by the expression and providing the particular data from the server to the client;
means for executing at the client the expression using the particular data from the server to produce the component; and
means for displaying the component.

\* \* \* \* \*